Feb. 3, 1970  V. J. LUNDELL  3,492,796
METHOD FOR COMPACTING FORAGE CROPS
Original Filed Nov. 20, 1961  20 Sheets-Sheet 1
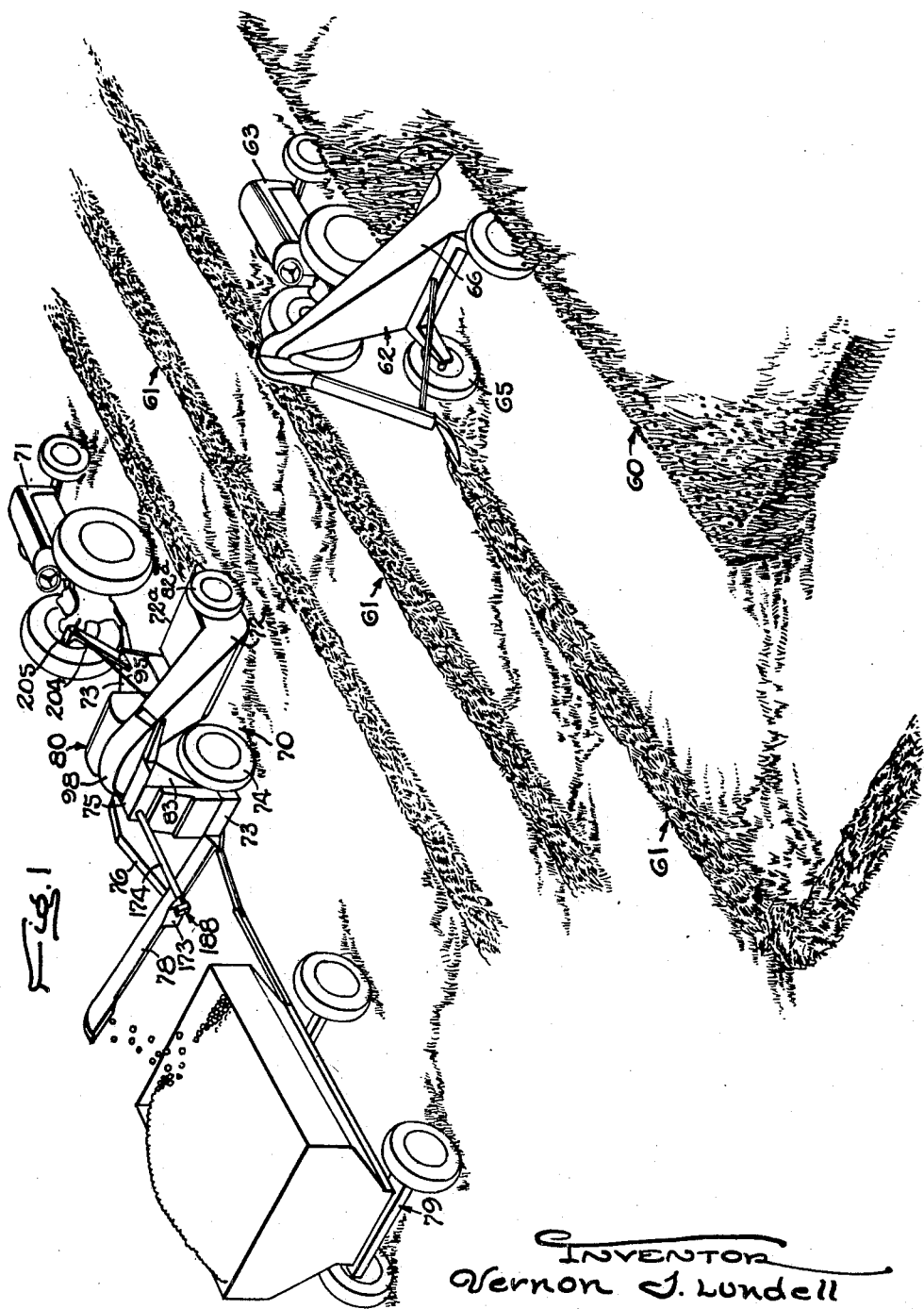
INVENTOR
Vernon J. Lundell
By: Wolfe, Hubbard, Voit & Chann
ATTORNEYS

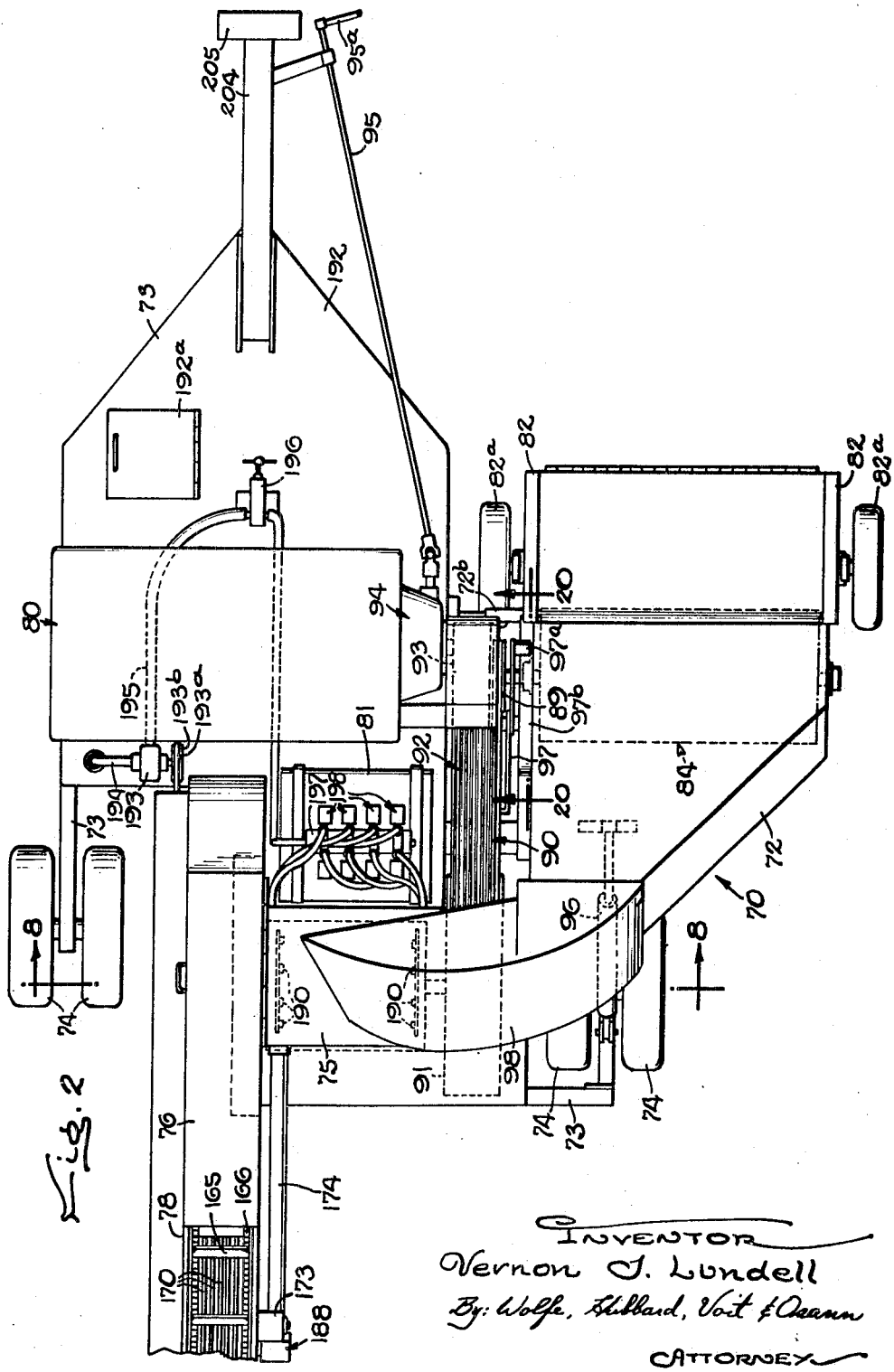

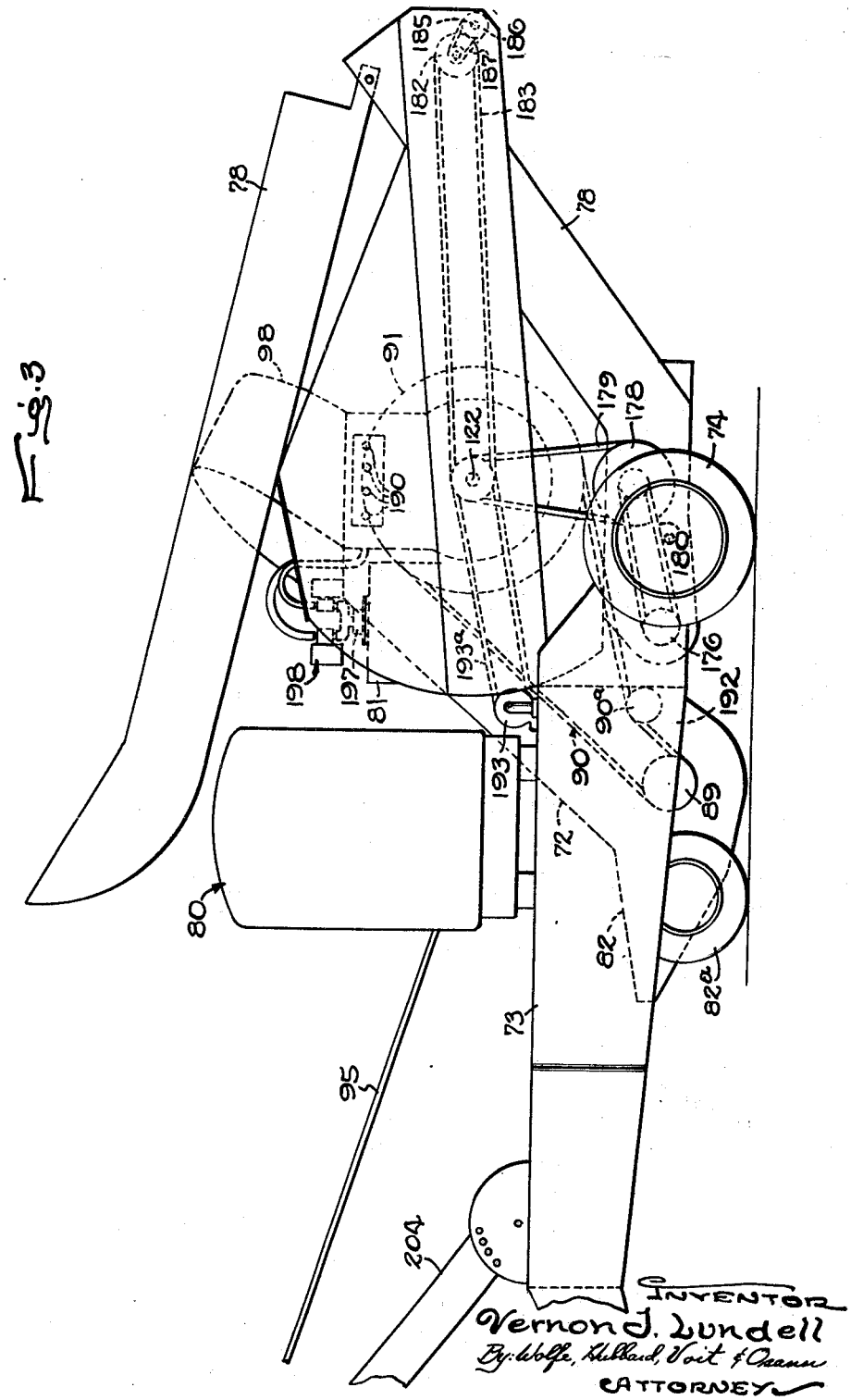

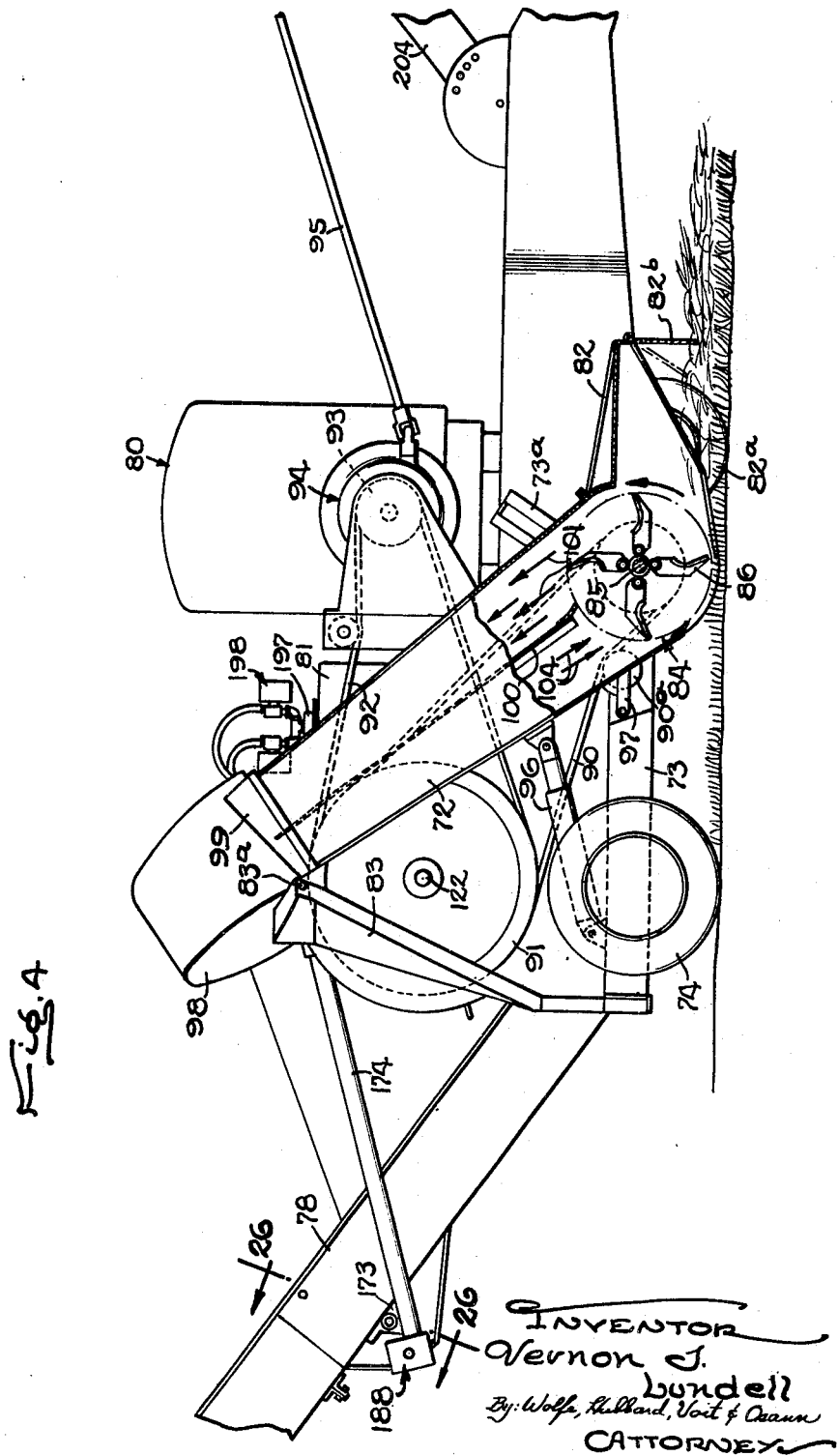

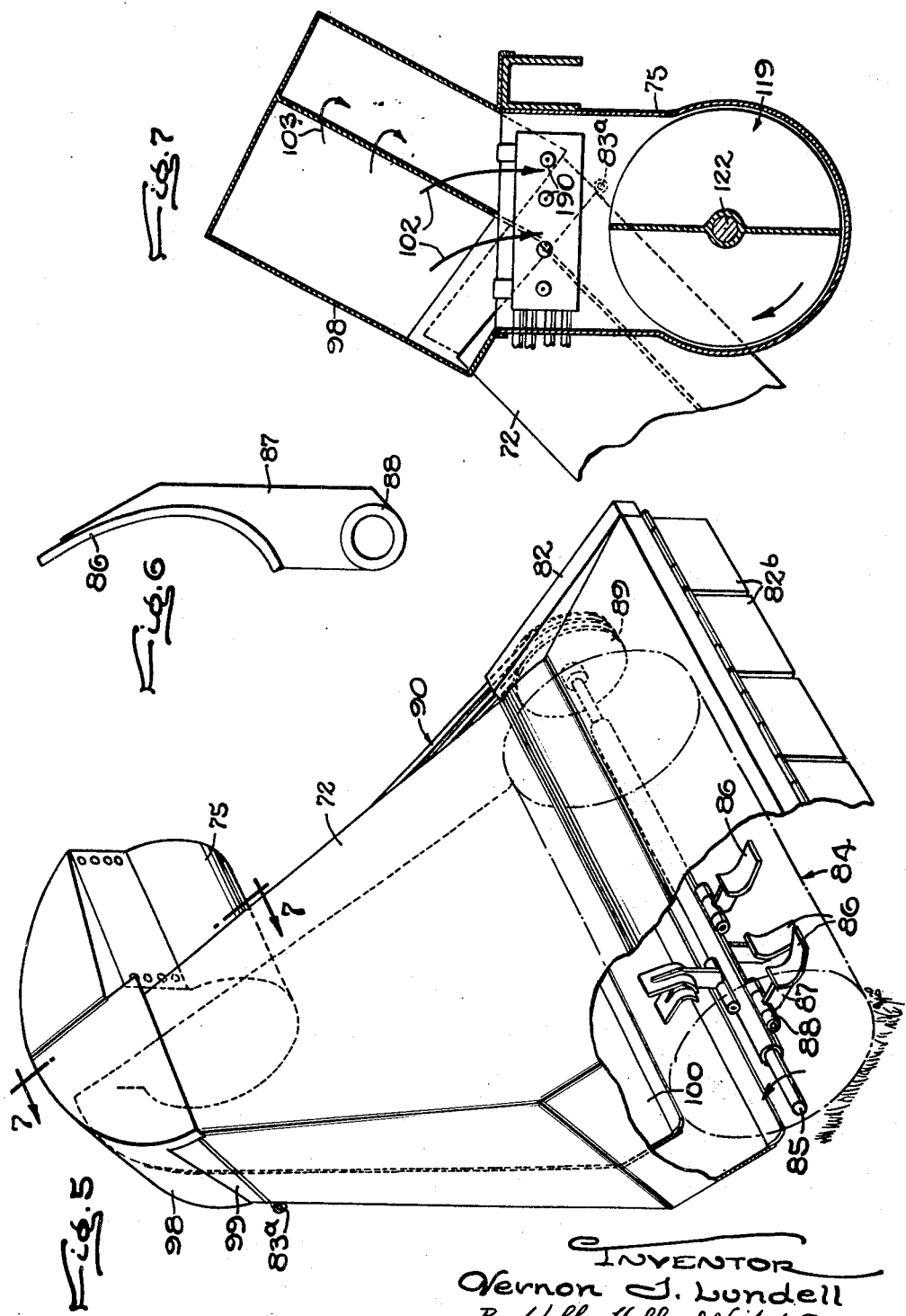

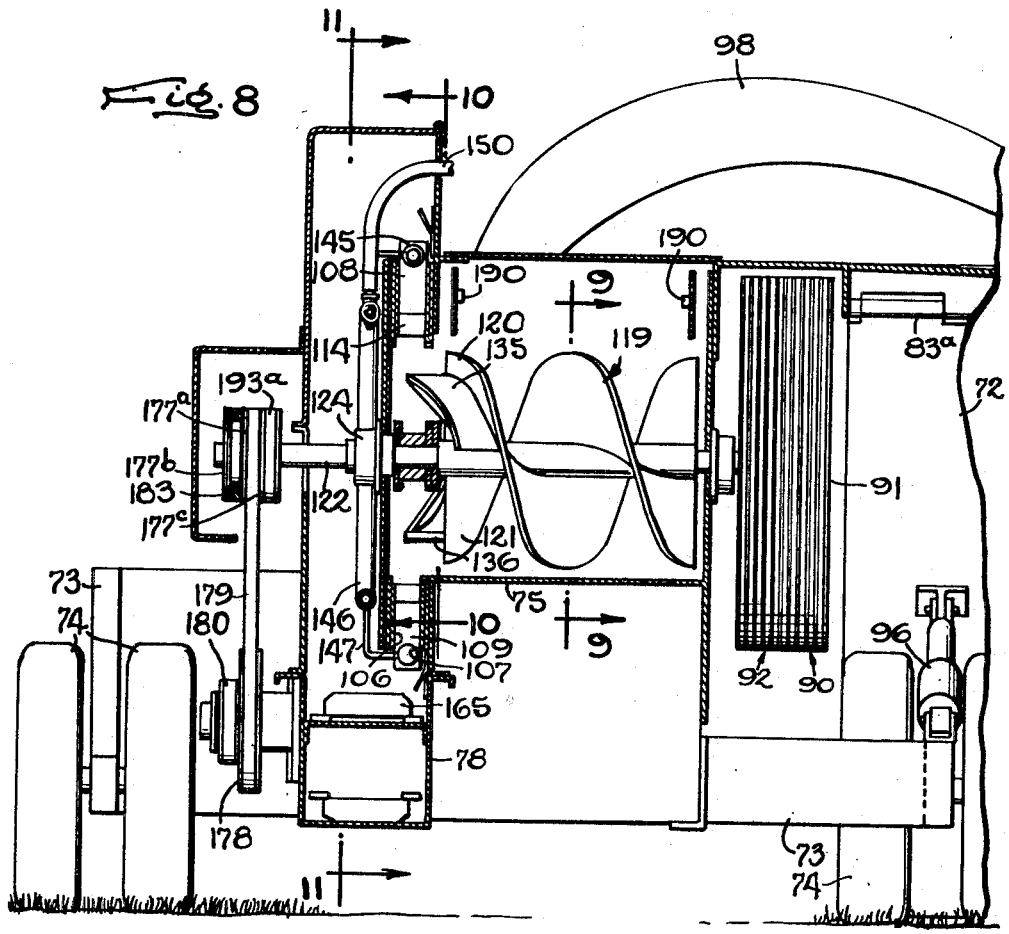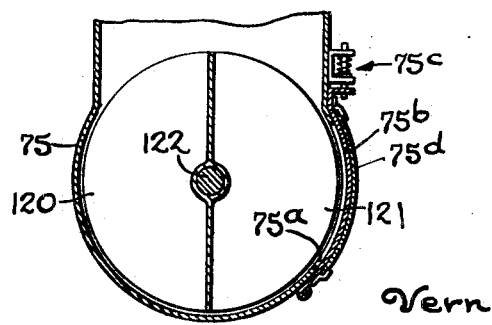

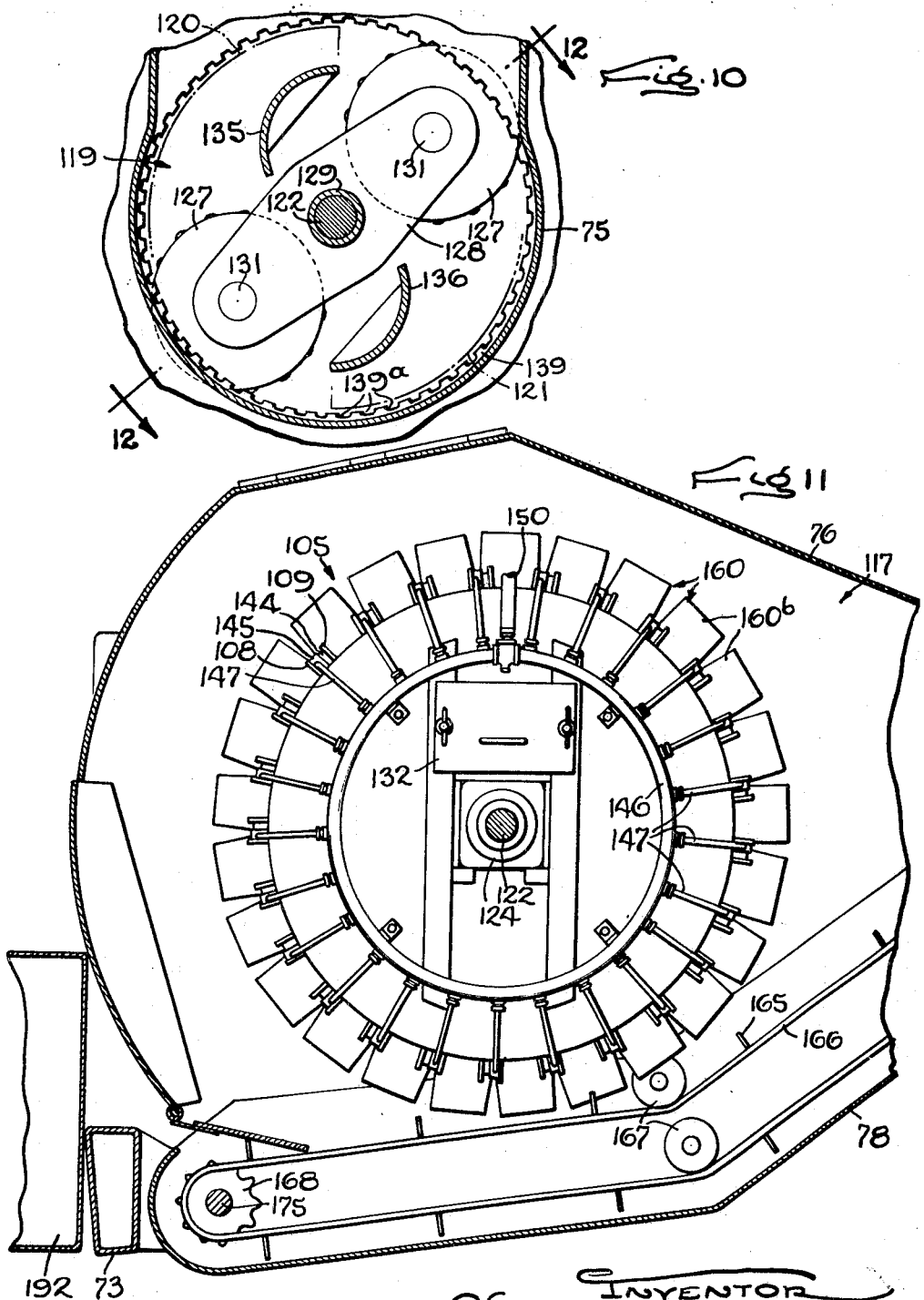

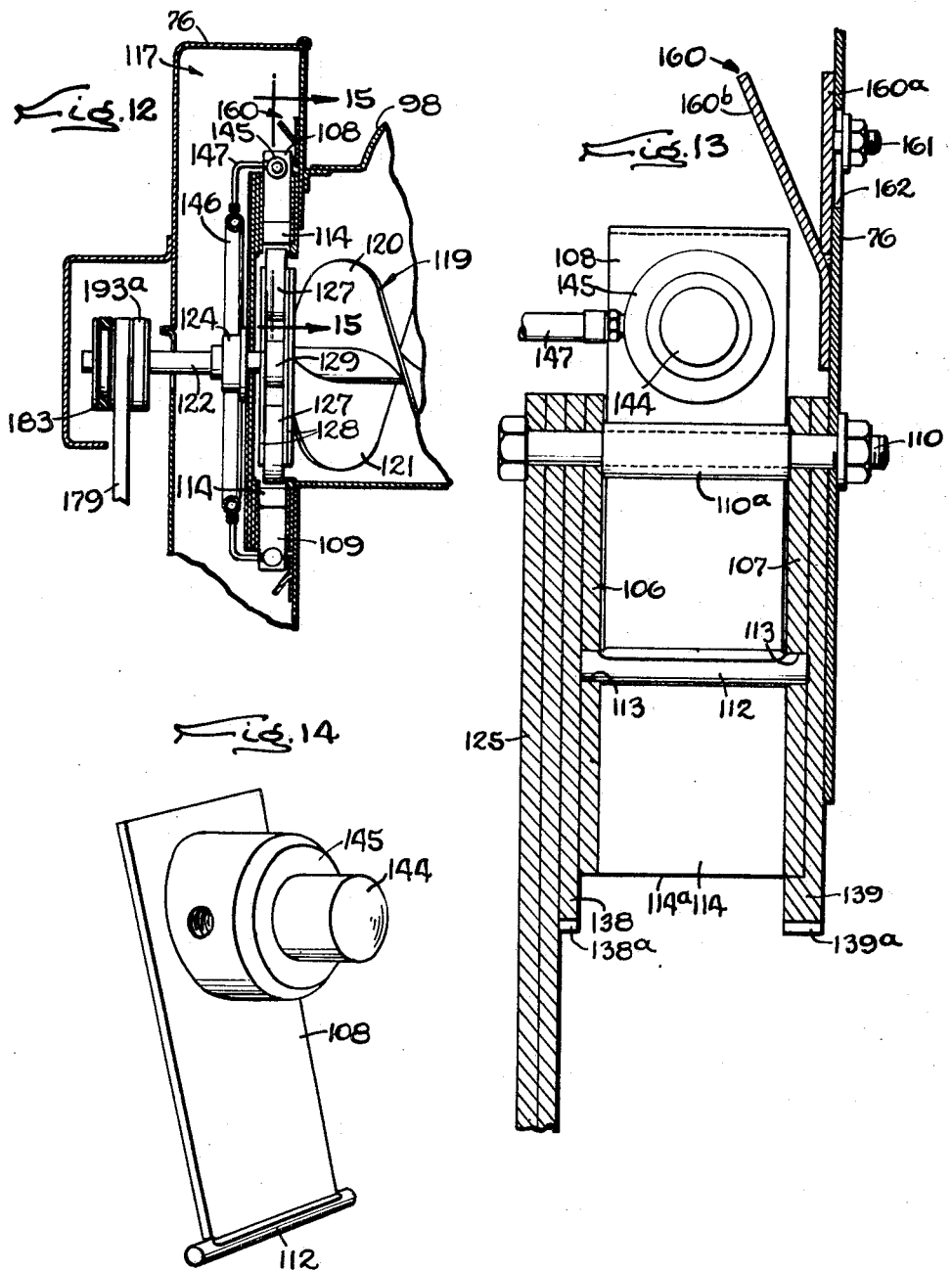

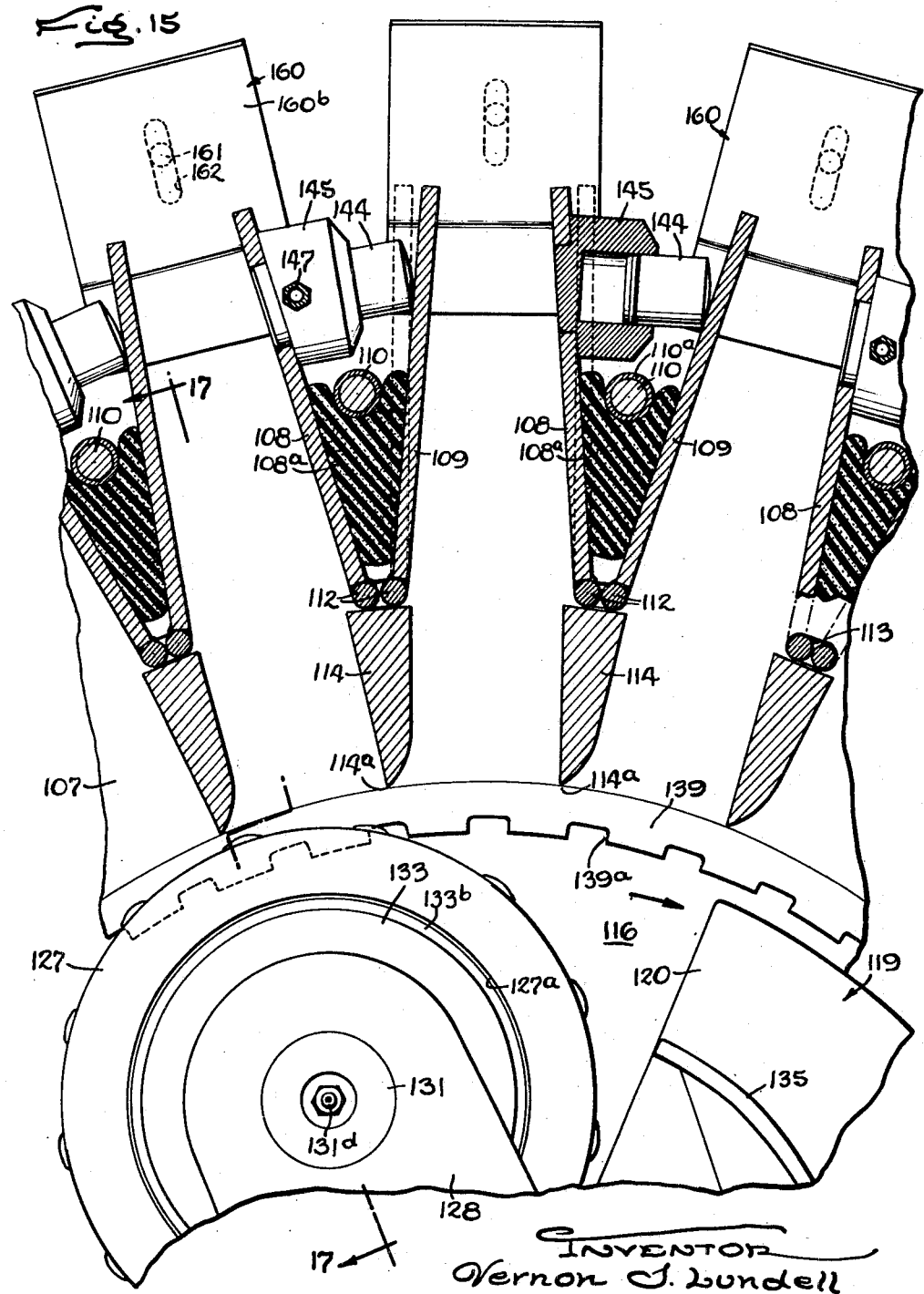

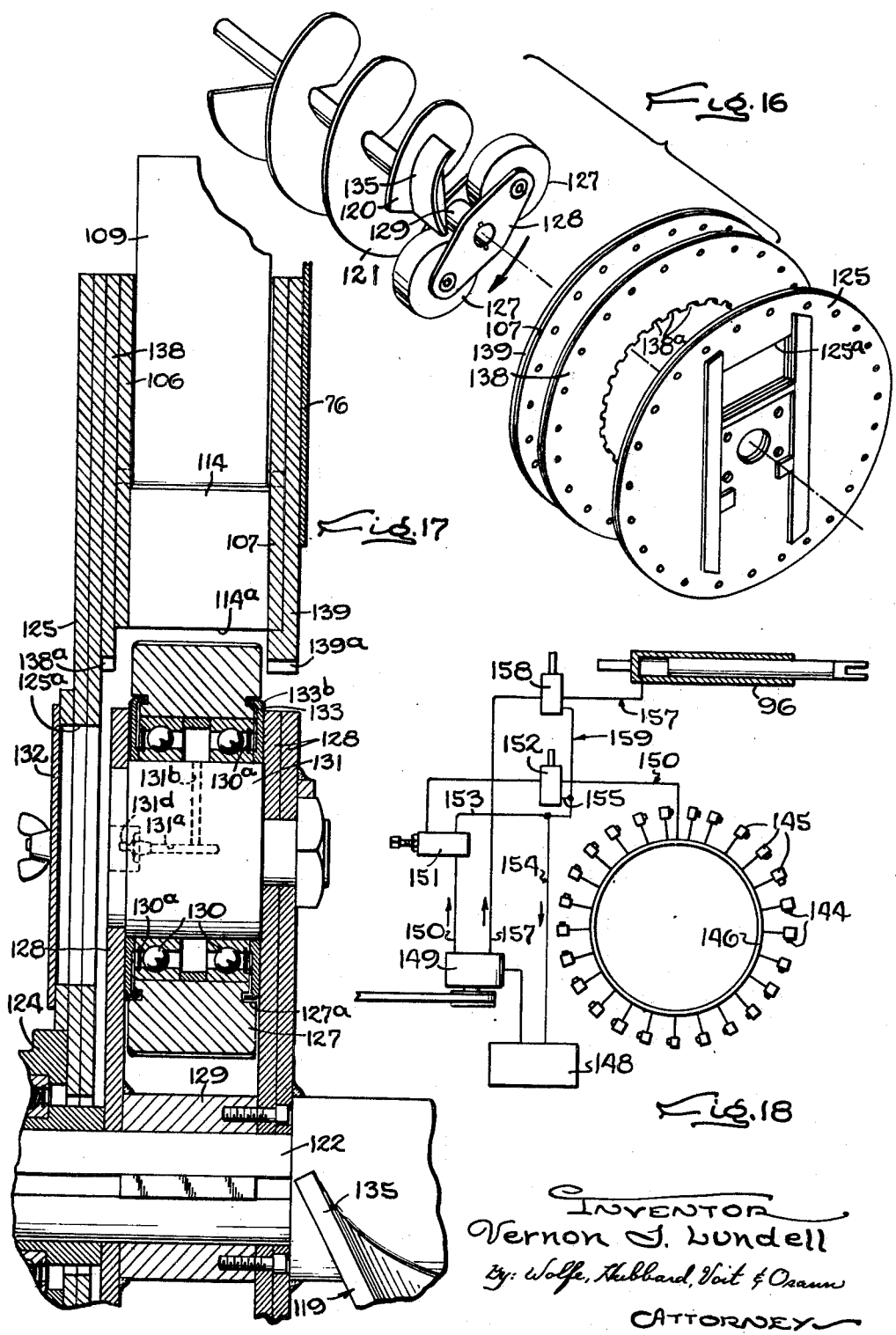

Feb. 3, 1970     V. J. LUNDELL     3,492,796
METHOD FOR COMPACTING FORAGE CROPS
Original Filed Nov. 20, 1961     20 Sheets-Sheet 11
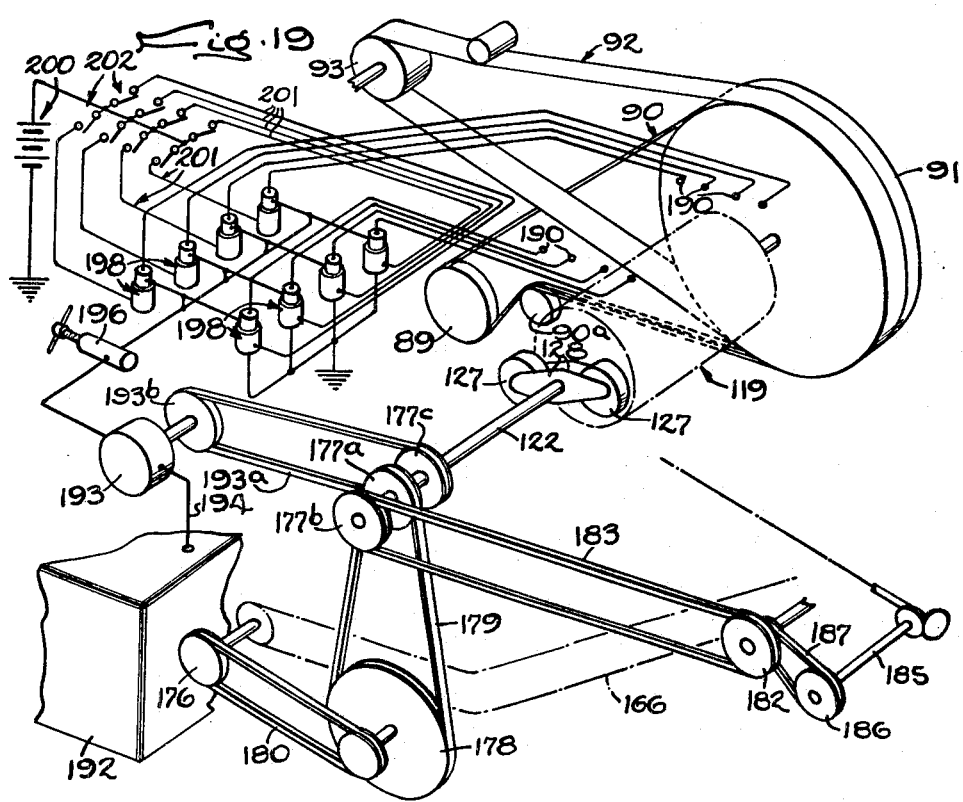
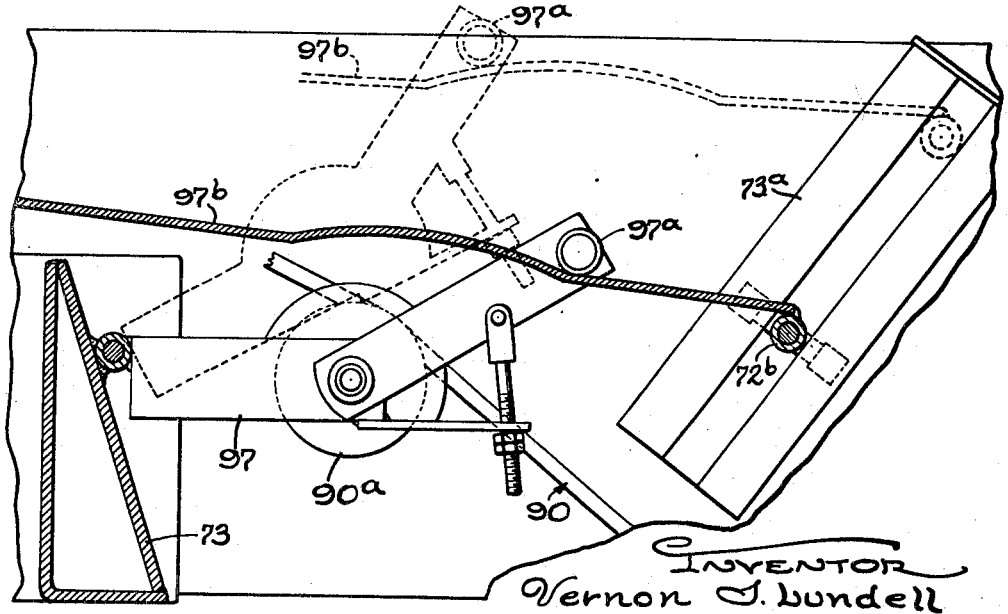

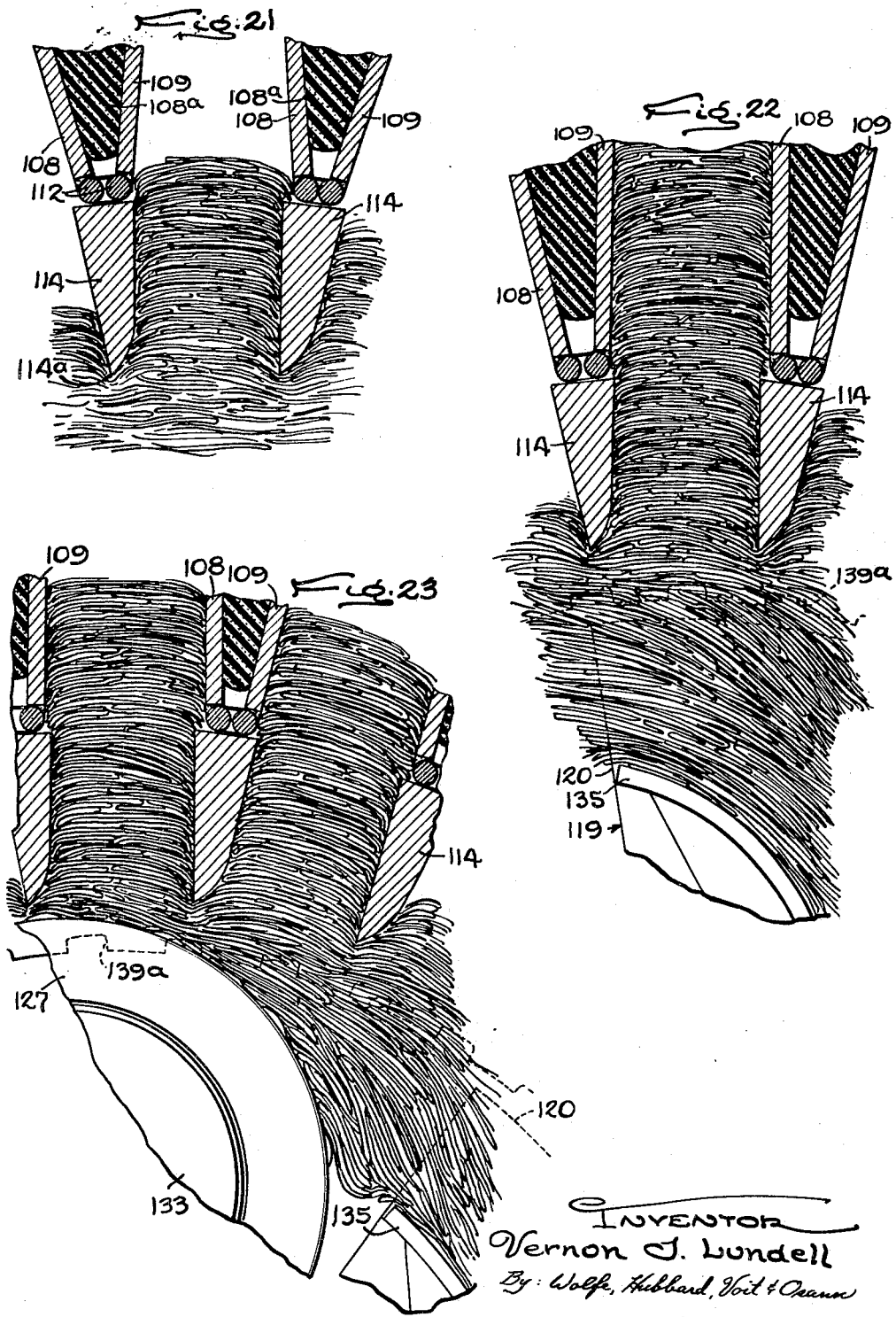

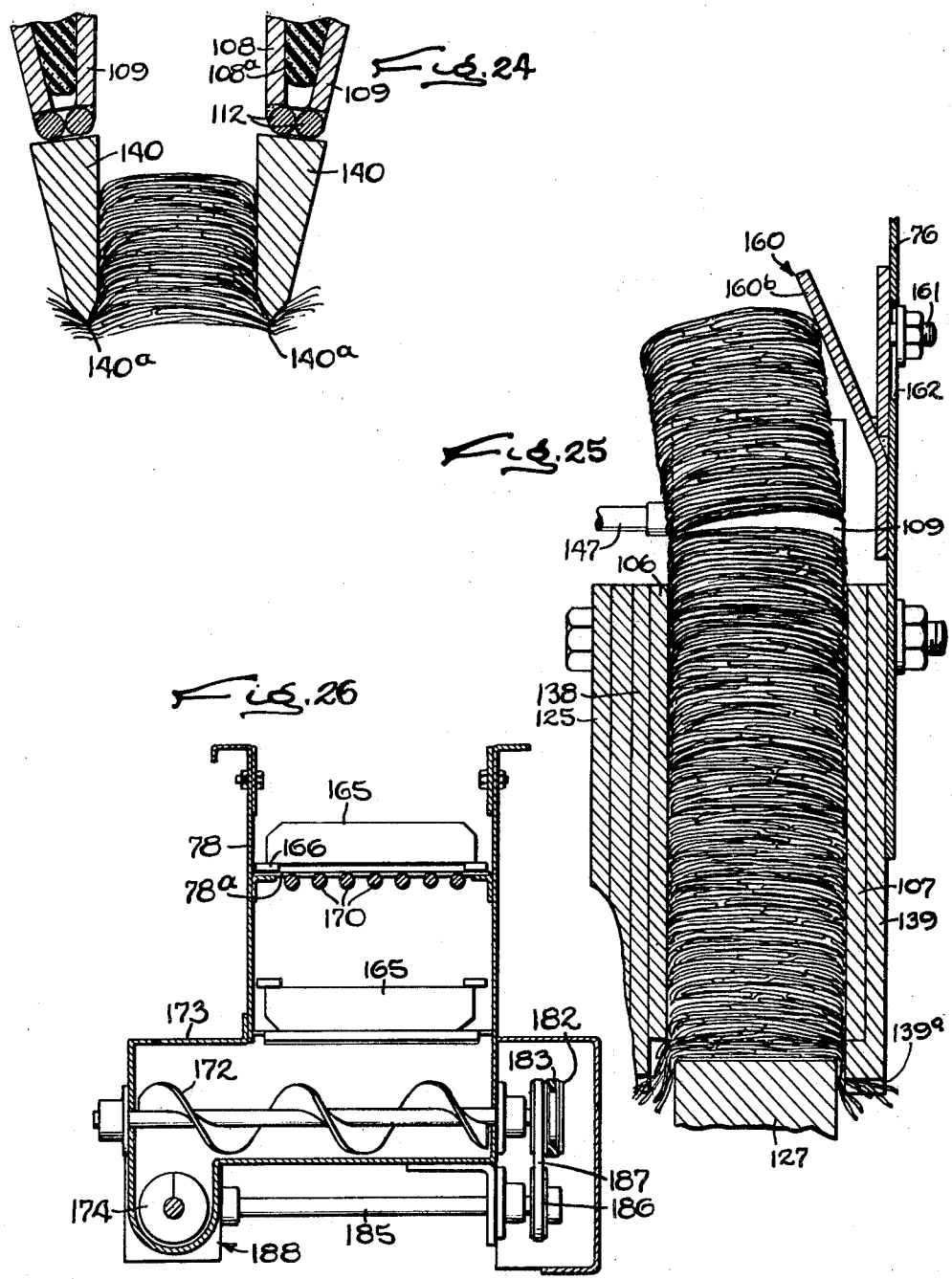

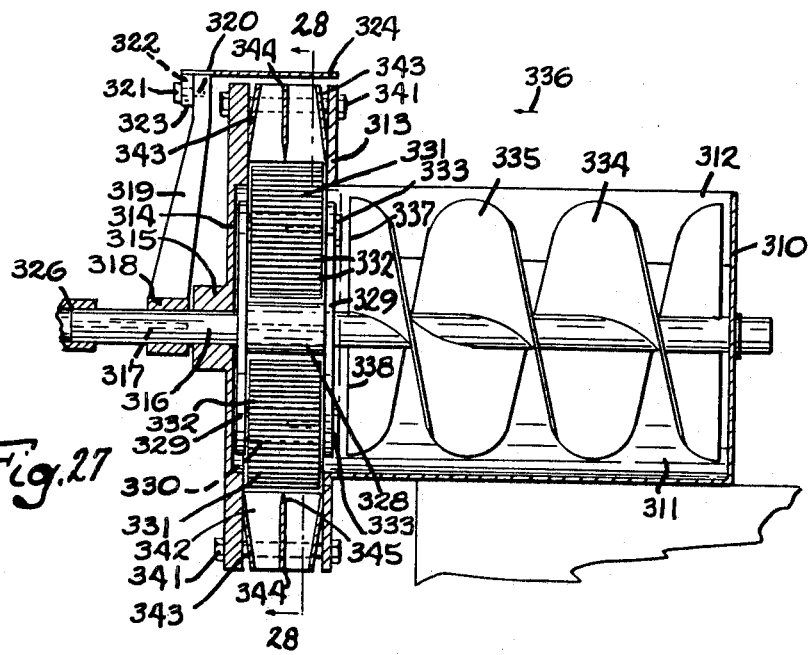
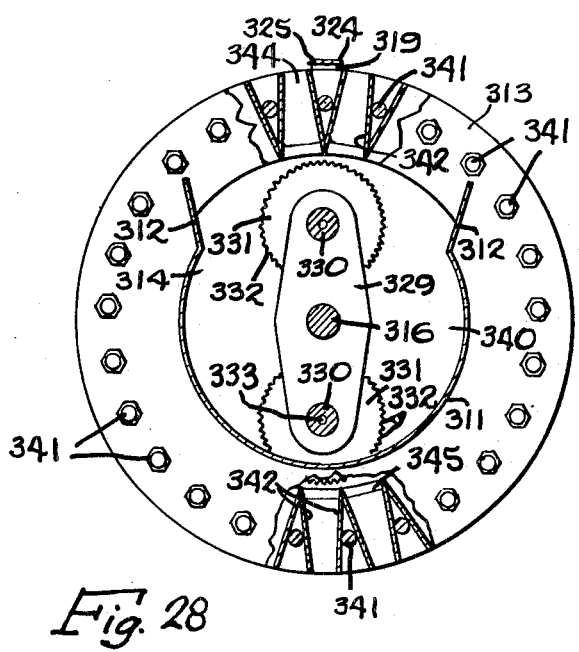
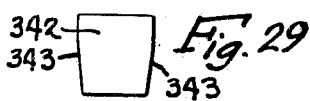

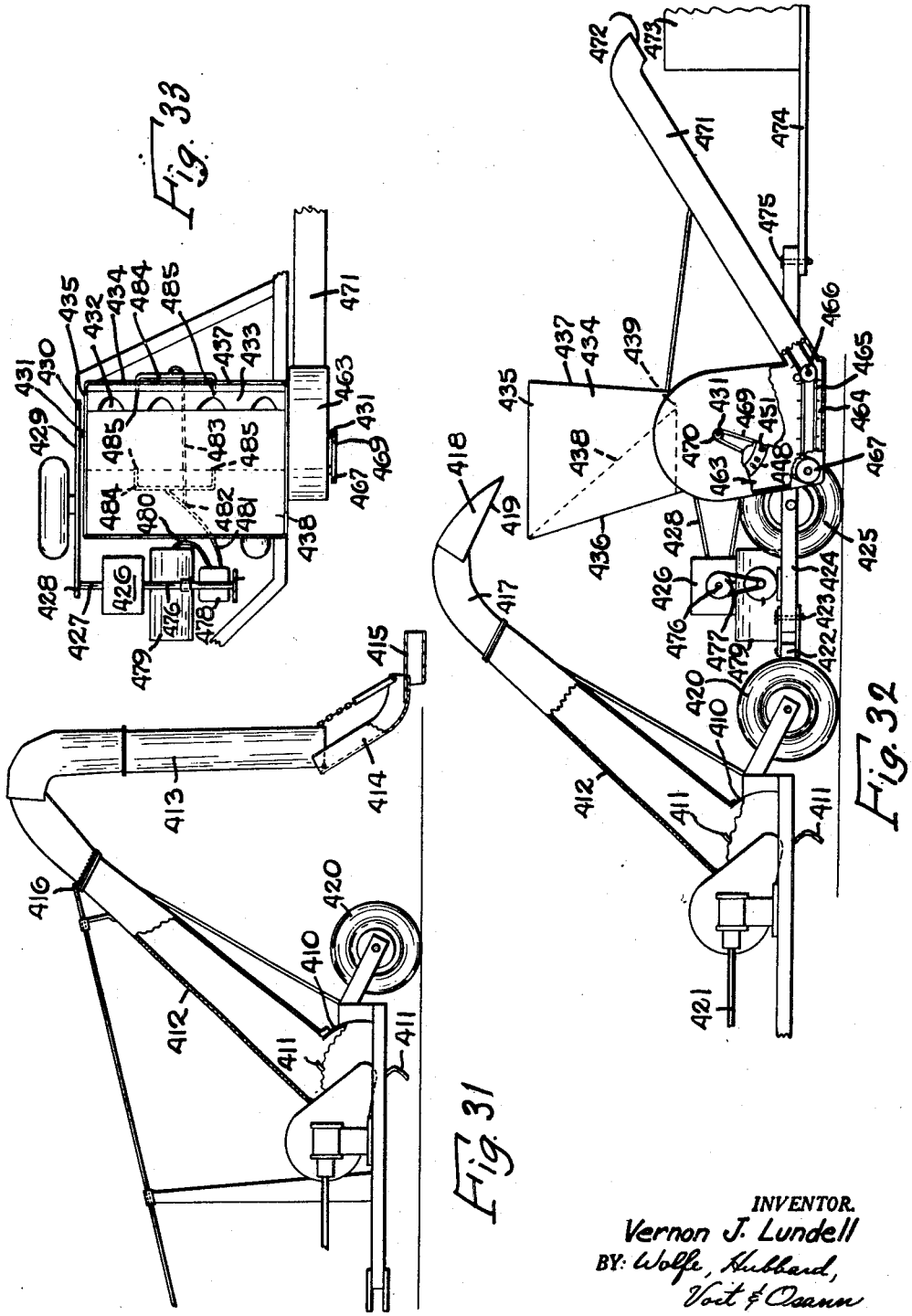

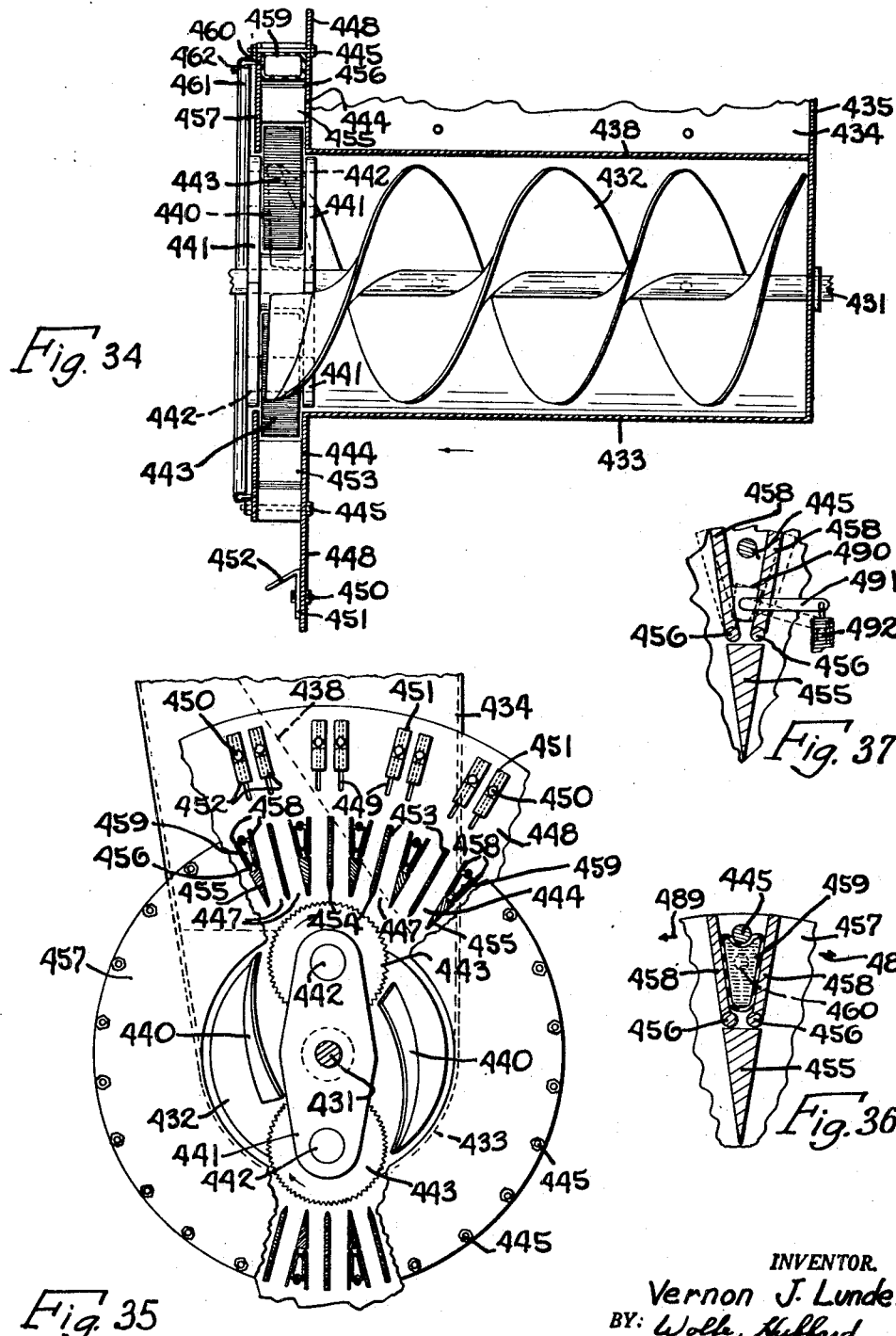

INVENTOR.
Vernon J. Lundell
BY: Wolfe, Hubbard,
Voit & Osann
ATTORNEY

Feb. 3, 1970  V. J. LUNDELL  3,492,796
METHOD FOR COMPACTING FORAGE CROPS
Original Filed Nov. 20, 1961  20 Sheets-Sheet 20
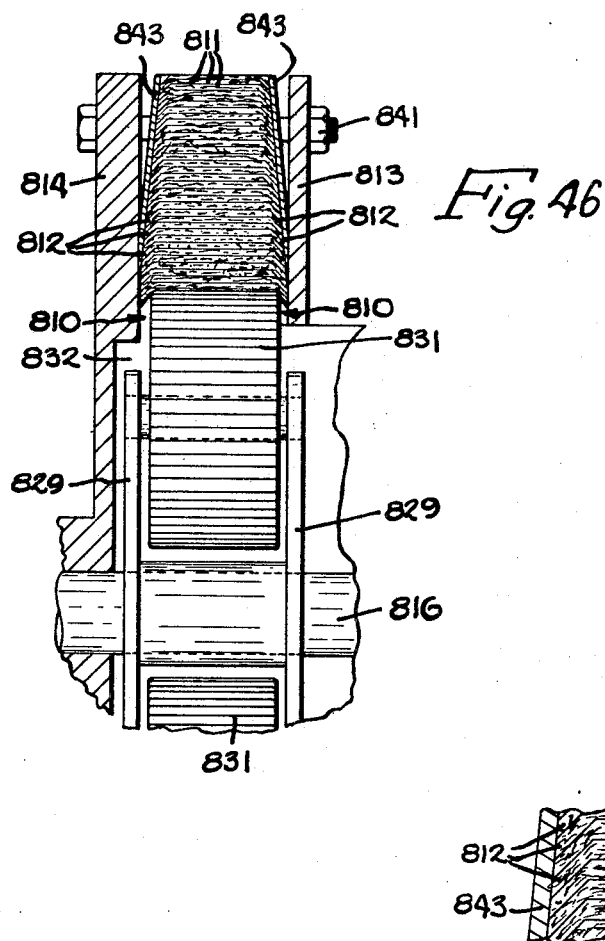
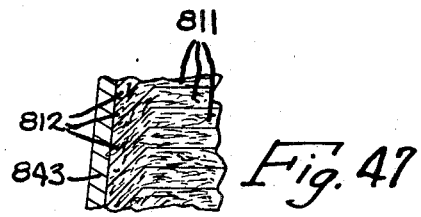
INVENTOR.
Vernon J. Lundell
BY: Wolfe, Hubbard,
Voit & Osann
ATTORNEY

United States Patent Office 3,492,796
Patented Feb. 3, 1970

3,492,796
METHOD FOR COMPACTING FORAGE CROPS
Vernon J. Lundell, Cherokee, Iowa
(Box 400, Detroit, Mich. 48232)
Application Nov. 20, 1961, Ser. No. 153,599, which is a continuation-in-part of application Ser. No. 797,210, Mar. 4, 1959. Divided and this application July 3, 1967, Ser. No. 661,742
Int. Cl. A01d *81/00*
U.S. Cl. 56—1                                  12 Claims

ABSTRACT OF THE DISCLOSURE

A method of preparing hay by chopping and co-mingling the stems and leaves, delivering the co-mingled mass while suspended in air to the entrance ends of a plurality of die cells and pressing the hay into wafers; with provision for maintaining equal pressure on the hay within all the cells so as to form wafers of uniform density, breaking off the extruded hay into wafers of substantially uniform length, conveying away the wafers, collecting fines from the wafers, and redelivering the fines to the entrances of the die cells by re-circulating excess air containing hay particles to co-mingle the same with subsequently chopped hay.

---

The present application is a divisional application based on the copending application of Vernon J. Lundell, Ser. No. 153,599, filed Nov. 20, 1961, as a continuation-in-part of applicant's then copending applications: Ser. No. 797,210, filed Mar. 4, 1959, now abandoned; Ser. No. 30,000, filed May 18, 1960, now abandoned; Ser. No. 74,919, filed Dec. 9, 1960, now Patent No. 3,203,366; Ser. No. 110,224, filed May 15, 1961, now abandoned; and Ser. No. 140,876, filed Sept. 26, 1961, now abandoned.

The present invention relates generally to the harvesting of forage crops and more particularly to the preparation of forage crops such as hay so as to facilitate its handling, storage and use.

Of the many operations to be performed on a farm, perhaps the most consuming of time, labor and space are those entailed in harvesting, handling, storing and using forage crops of which hay is representative. At present the most common practice in making hay involves baling to reduce bulk and save time. Baled hay, however, does not lend itself readily to mechanized handling for even with the advent of bale throwers, barn elevators and haymow conveyors, it is still necessary for a farmer to do much lifting and lugging of bales and handling of the hay in getting it to the feeders.

It has been suggested in the past that hay be formed into pellets and wafers rather than bales. Both terms, "wafers" and "pellets," have been defined as agglomerated feed formed by compacting their ingredients and are used herein synonymously.

Preparing hay in wafer or pellet form would be advantageous because of the possibility of mechanization all the way from the field to the feeders with a resulting saving of time, space and labor. Heretofore, however, there has not been a method or machine appropriate for use on the average farm for producing pellets or wafers of hay.

Accordingly it is one object of the present invention to provide a method for preparing hay in which the hay is cut into small sized pieces, the stems and leaves are co-mingled uniformly, and then is compacted into wafers or pellets of substantially uniform density, size and shape.

A further object is to provide a machine for preparing hay which is effective to pick up the hay, render it into a homogenized mass of stem and leaf pieces and compact the same into wafers or pellets which are conveyed away from the machine for storage and subsequent use.

A related and more specific object is to provide a machine for preparing hay for the picking up, chopping and co-mingling of hay from a windrow, expressing the chopped and co-mingled material through die cells in which the hay is uniformly compressed and subsequently discharged in the form of compacted pellets or wafers.

Still another object resides in the provision of a hay wafering or pelletizing machine intended primarily for use in the field, characterized by its simplicity, requiring minimum power for its operation, and consisting largely of simply formed parts, thereby permitting manufacture and sale at a cost that is sufficiently low to justify purchase by farmers producing even relatively small acreages of forage crops.

Yet another object is to provide forage crop pellets or wafers separate from one another, of substantially constant density, size and shape, and of an improved form tending to maintain size and shape and being resistive to wear in handling.

Other objects and advantages of the invention will become apparent from the following description and upon reference to the accompanying drawings, in which:

FIGURE 1 is a perspective view illustrating the practice of the present invention in the preparing of hay, generally showing standing hay being cut, windrowed and subsequently picked up, formed into wafers, and the wafers delivered to a collecting receptacle.

FIG. 2 is a plan view of an illustration wafering machine embodying certain aspects of the present invention.

FIG. 3 is a left side elevation of the machine shown in FIG. 2.

FIG. 4 is a right side elevation of the machine shown in FIGS. 2 and 3.

FIG. 5 is a fragmentary perspective view of the pickup, chopping and delivery portions of the machine shown in the preceding figures.

FIG. 6 is a side elevation of one of the pickup and chopping elements on a somewhat enlarged scale.

FIG. 7 is a fragmentary vertical section taken substantially in the plane of line 7—7 in FIG. 5.

FIG. 8 is a fragmentary vertical section taken substantially in the plane of line 8—8 in FIG. 2.

FIG. 9 is a fragmentary vertical section taken substantially in the plane indicated by line 9—9 in FIG. 8.

FIG. 10 is a fragmentary vertical section taken substantially in the plane of line 10—10 in FIG. 8.

FIG. 11 is a fragmentary vertical section taken substantially in the plane of line 11—11 in FIG. 8.

FIG. 12 is a fragmentary transverse section taken substantially in the plane indicated by line 12—12 in FIG. 10.

FIG. 13 is a fragmentary sectional view taken substantially in the same plane as FIG. 8 and showing a portion thereof substantially enlarged.

FIG. 14 is a fragmentary perspective view of a die cell side wall, the same being shown in elevation in FIGS. 8, 12 and 13.

FIG. 15 is an enlarged transverse section taken substantially in the plane of line 15—15 in FIG. 12.

FIG. 16 is a fragmentary exploded perspective of the feed auger, pelleting chamber and compressing elements of the illustrative machine.

FIG. 17 is a vertical section taken substantially in the plane indicated by line 17—17 in FIG. 15.

FIG. 18 is a diagrammatic representation of the hydraulic circuit incorporated in the illustrative device.

FIG. 19 is a diagrammatic perspective representation of the power drive arrangement and of the moisture introduction system of the illustrative device.

FIG. 20 is a fragmentary section taken substantially in the plane of line 20—20 in FIG. 2.

FIGS. 21, 22 and 23 are fragmentary transverse sectional views, in sequence, taken substantially in the plane of line 15—15 in FIG. 12 and illustrating in sequence wafer or pellet formation with the practice of the present invention.

FIG. 24 is a view similar to FIG. 21, but illustrating a modified form of means defining the entrance end of a die cell of the illustrative device.

FIG. 25 is a fragmentary sectional view similar to FIG. 13 and illustrating the breaking off of a formed wafer or pellet.

FIG. 26 is a fragmentary vertical section taken substantially in the plane of line 26—26 in FIG. 4.

FIG. 27 is a sectional view taken generally longitudinally of a modified form of device embodying the present invention.

FIG. 28 is a sectional view taken approximately along the line 28—28 in FIG. 27.

FIG. 29 is a side view of one of the cell units shown in FIGS. 27 and 28.

FIG. 30 is an end view of the cell unit of FIG. 29.

FIG. 30A is an end view similar to FIG. 30 but showing a cell unit having more partitions to thereby provide more though smaller sized wafers in a unit area.

FIG. 31 is a side elevation showing a machine such as that illustrated in the righthand portion of FIG. 1 for cutting chopping and windrowing hay.

FIG. 32 is a side elevation of a modified form of a complete machine for practicing the present invention.

FIG. 33 is a plan view of a portion of the machine of FIG. 32.

FIG. 34 is a vertical section taken substantially longitudinally of the conveying member and pellet-forming chamber of the machine shown in FIGS. 32 and 33.

FIG. 35 is an end view of the pellet-forming unit of FIG. 34 with parts broken away to show fragmentary sections.

FIGS. 36 and 37 are fragmentary sections on an enlarged scale showing modified forms of wall structures separating adjacent die cells.

FIG. 46 is a vertical section similar to FIG. 17, but showing a further modified form.

FIG. 47 is a fragmentary section on an enlarged scale taken from FIG. 47.

Figure 38:
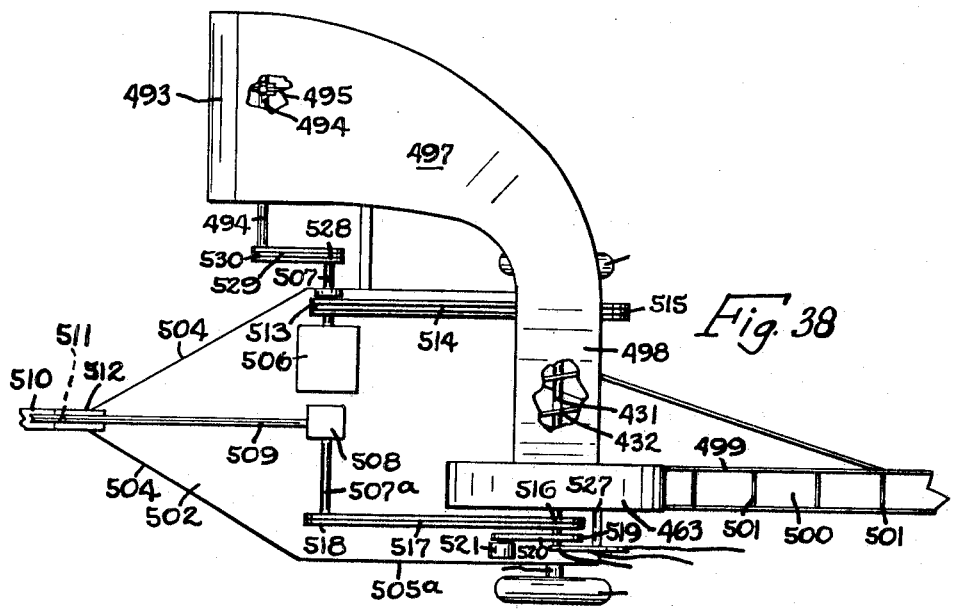
FIG. 38 is a plan view of yet another form of machine embodying features of the present invention.

While the invention is described herein in connection with certain illustrative embodiments and modes, it should be understood that there is no intention to limit the invention to the specific forms disclosed. On the contrary the intention is to cover all modifications, alternatives and equivalents embraced within the spirit and scope of the invention as defined in the appended claims.

Referring more particularly to the drawings, FIG. 1 is a diagrammatic pictorial view illustrative of the practice of the present invention. While details are brought out in the following description and accompanying figures, it is possible to visualize from FIG. 1 the preparation of a forage crop such as hay by the practice of the present invention. Thus it is contemplated that a standing crop of hay, indicated generally at 60, is cut and placed in windrows 61. For this purpose there is shown a forage harvester generally designated 42 which is adapted to be drawn through the field and powered by a conventional tractor 63. Preferably the forage harvester is of the rotary flail type such, for example, as the one shown in Vernon J. Lundell Patent No. 2,786,317, granted Mar. 26, 1957. While not illustrated in detail, it will suffice for present purposes to note that the flail type forage harvester 62 is supported on ground wheels 65 and mounts a chute 66. At the forward end of the chute 66, though not shown in FIG. 1, is a rotary flail disposed with its axis in generally horizontal, spaced and parallel relation to the ground. The flail includes a series of pivotally mounted hammers or knives operative to cut the standing forage crop, chop and bruise the same, and impel it into and through the chute 66 from which it is delivered in windrows 61.

After the formation of the cut and chopped hay into windrows, a suitable time interval is allowed to elapse to permit drying. This interval is usually of a number of hours duration and may extend over a period of a few days depending upon weather conditions, particularly relative humidity. Desirably, the hay is allowed to remain in the windrows until its moisture content is reduced to about 20% or less by weight.

When the moisture content of the hay has reached an acceptable level, it can be formed into pellets or wafers that maintain their size and shape and can be stored for indefinite periods without molding or otherwise becoming spoiled. In practicing the present invention there is contemplated the picking up of the windrowed hay, rechopping the same, co-mingling the chopped stems and leaves to provide a homogenized hay mass. This hay mass is delivered into a wafering or pelleting device wherein it is expressed through an arrangement of die cells being subject to constant pressure upon passage therethrough so as to compact it into wafers or pellets. The wafers thus formed are collected and are conveyed away for delivery to a suitable storage facility.

To this end there is shown in FIG. 1 a machine, generally indicated at 70, which is adapted to be drawn through the hay field and along the windrows 61 by means of a tractor 71. The machine 70 includes a delivery chute 72 carried by a frame 73 which is equipped with ground wheels 74. The chute 72 includes at its forward end 72a means for picking up the windrowed hay, chopping it and delivering the chopped hay into the chute 72. From the chute 72, in the illustrative device the hay is received in a hopper 75 carried by the frame 73. From the hopper the hay is conveyed into the wafering mechanism which is enclosed in a housing 76. A suitable conveyor 78 is provided for collecting the wafers from the housing 76. As shown, a wagon 79 is trailed behind the machine 70 for receiving the wafers delivered by the conveyor 78 and by means of which the wafers can be carried away for storage.

Desirably the machine incorporates its own power source. For this purpose the illustrative machine 70 is equipped with an internal combustion engine indicated generally at 80. Fuel for the engine is supplied from a tank 81 which as shown is mounted on the frame 73 rearwardly of the engine (FIG. 2).

The delivery chute 72 is mounted at the right side of the frame 73. It is disposed in an upwardly and rearwardly inclined position. Its forward end 72a is defined by a forwardly projecting sub-frame 82 which is supported on a pair of ground wheels 82a. The upper end of the chute 72 is supported upon a brace 83 interposed between the chute and the machine frame 73, and to permit angular movement the chute is pivotally connected at 83a to the brace.

Adjacent the forward end of the chute there is provided means for picking up the windrowed hay and delivering it into the chute 72. Preferably this means comprises a rotary flail 84 indicated in phantom outline in FIG. 2 and in more detail in FIGS. 4 and 5. The flail includes a central shaft 85 journalled transversely in the sub-frame 82 rearwardly of the ground engaging wheels 82a. The shaft 85 mounts a series of blades 86 which are sometimes referred to as hammers. The outer end of each of the blades 86 is of arcuate paddle form. The blades 86 are pivotally connected to the shaft 85 in longitudinally and angularly spaced relation. Each of the blades 86 includes a supporting arm 87 having at its inner end a sleeve 88 for receiving a pivot pin by means of which it is connected to the shaft 85. When the blades 86 are in place and are rotated by the shaft 85 the paths traversed by their paddle-like outer ends overlap. The flail shaft 85 is rotated in a direction counterclockwise when viewed from the right side of the machine, such that the tips of the blades in the lower portion of their paths move in the direction of movement of the machine. Thus they engage and lift the hay in the windrow 61 as the machine 70 is drawn along the hayfield.

The transverse, generally horizontal portion of the forward end of the chute 72a not only assists in the picking-up of the hay, but in addition it serves to prevent forward and upward tossing of the hay as it is engaged by the blades 86 of the flail 84. To preclude the throwing of foreign objects that might be encountered in the field, baffle screens 82b are pivoted in depending relation from the leading edge of the chute portion 72a. The pivoted mounting allows the screens to swing rearwardly along the top of the windrow as the machine 70 progresses.

The flail shaft 85 is rotated at high speed by a belt drive from the engine 80. This drive includes a sheave 89 fixed to the left or inner end of the shaft 85 and drive belts 90 which are tensioned by an idler drum 90a. The belts 90 engage a drum 91 which, in turn, is driven by main drive belts 92 interposed between the drum 91 and a main drive sheave 93. The latter is coupled to the engine 80 by means of a suitable clutch indicated generally at 94. The clutch is adapted to be engaged and disengaged by means of a hand lever 95. The hand lever 95 is extended forwardly and terminates in a handle 95a located for convenient manipulation by the operator of the tractor 71.

Means is provided for elevating the forward end of the chute 72, the sub-frame 82, and the flail 94, between an operating position, as shown in the drawings, and a transport position. In the latter position the ground engaging wheels 82a are raised out of contact with the ground. For this purpose the illustrative device is provided with a hydraulic actuator lift 96. The lift 96 is interposed between the frame 73 and the rear side of the chute 72 (FIG. 4).

When the forward end of the forage pick-up and chopping section of the instant machine is elevated upon operation of the lift 96, it moves forwardly as well. This movement is controlled by a guide strut 72b interposed between the side wall of the chute 72 and the juxtaposed side panel of the implement frame 73. The strut 72b mounts a crosshead 72c which is received in a diagonally disposed guide channel 73a rigid with the frame 73.

Provision is made for altering the effective length of the flail drive belts 90 to permit such movement. As noted above, the belts 90 extend about the flail shaft sheaves 89 and the drum 91 and over idler 90a. As the sheave 89 moves forwardly and upwardly with the outer end of the chute 72, the effective belt length is extended, and at the same time tension is maintained. Thus means is provided for changing the position of the belt tensioning idler 90a as an incident to raising and lowering the forward end of this section of the illustrative machine. To this end the idler is journaled intermediate the ends of a bracket 97 (FIG. 20) which is pivoted at one end to the implement frame 73 so as to permit movement of its free end up and down with the forward end of the chute 72. At its free end the bracket 97 mounts a cam follower roller 97a which rides upon an arched cam track 97b carried by the side wall of the chute 72 and guide strut 72b for movement therewith. As the cam track 97b moves upwardly and forwardly, the follower roller 97a moves upwardly with it. At this same time, since the roller 97a is constrained by the idler mounting bracket 97, the roller travels along the track 97b in a rearward direction relative thereto. Thus the idler 90a is moved through an arc less than that traversed by the flail sheave 89, and as a result the idler is maintained in engagement with the flail drive belts 90 yet permits extension of their effective lengths. Desirably the cam track 97b is formed of spring steel 20 so as to resiliently urge the idler 90a into engagement with the belts 90.

Upon rotation of the flail shaft 85, not only do the flail blades 86 engage and lift the hay, but the blades also serve both to chop the hay and, by virtue of centrifgual force, to throw it upwardly and rearwardly into the upper or forward portion of the chute 72. Additionally, and as a result of the arrangement of the blades 86 upon the shaft 85 in longitudinally and angularly spaced relation, the blades 86 operate in the manner of a drum type fan effectively scooping air and delivering such air along with the hay particles into the chute 72 at a relatively high velocity. This not only assists in conveying the hay particles along the chute 72, but it performs two additional functions as well. It will be apparent that the entrainment of the hay particles delivered by the flail 84 into the turbulent air stream results in a thorough co-mingling of the particles, including stems and leaves. There is thus provided a substantially homogenized mass of loose cut forage.

The second resulting function is what can fairly be termed a vacuum cleaning action. More particularly, the movement of the air caused by the rapidly rotating paddle-like flail blades 86 creates within the flail housing a region of substantially reduced air pressure as compared to that of the surrounding atmosphere. Consequently, loose hay particles, such for example as leaves which may have become separated from the hay in the windrow, are drawn up from the hayfield stubble and entrained in the air stream with the hay particles that result from the engagement of the flail blades with the windrowed hay. These drawn up particles, along with the others, are delivered into the chute 72 where they are pneumatically mixed within the loose mass of cut forage.

From the chute 72 the homogenized loose mass of cut or chopped hay is delivered to the hopper 75. To direct the hay from the chute 72 into the hopper 75 in arcuate hood 98 is interposed between the upper end of the chute 72 and the top of the hopper 75. To permit relative movement of the chute 72 as it is raised and lowered between an elevated transport position and a lowered operative position with respect to the hood 98 and yet maintain continuity of the delivery path for the chopped hay, a flexible connecting panel 99 is provided between the two (FIGS. 4 and 5).

Provision is made for returning the air delivered into the chute by the rotary flail 84 so as to save hay particles remaining airborne and undelivered to the hopper 75. For this purpose, a divider panel 100 is included in the chute 72 and hood 98. The panel 100 extends entirely across the chute 72 and terminates at its lower end at a point closely adjacent the path of the tips of the flail blades 86. The panel 100 thus divides the chute 72 into two independent passages. Into the upper or forward passage is delivered the cut and chopped forage entrained in the air stream from the flail. Material and air flow through such passage as is indicated by appropriate upwardly and rearwardly directed arrows 101 in FIG. 4.

When the loose mass of homogenized cut forage reaches the hood 98 it is directed thereby into the hopper 75 as indicated by the arrows 102 in FIG. 7. The upper end portion of the divider panel 100 terminates approximately centrally of the hood 98. Thus, the air which carried the homogenized loose mass of cut forage after having delivered the forage to the hopper 75 flows about the upper left edge of the divider panel 100 as indicated by the arrows 103 in FIG. 7 and can return by way of the lower rear portion of the chute 72. Any loose hay particles entrained therein are returned downwardly and forwardly, as indicated by the arrows 104, to the flail 84 for redelivery by it into the forward portion of the chute co-mingled with subsequently chopped hay picked up from the window.

To provide access to the interior of the hopper 75 an opening 75a is provided in its rear wall over which is a door 75b. As shown the door is hinged along its lower edge to the hopper wall and is adapted to be held closed by a spring latch 75c. Provision is also made on the hopper for the escape of excess air delivered into the hopper 75 from the chute but which is not returned by the chute toward the flail 84. In the present instance for this purpose the access door 75b is equipped with a transversely sliding panel 75d mounted upon the door 75b for adjustable positioning with respect thereto so as to permit selective control of the hopper wall opening 75a and thereby provide an opening through which excess air can escape.

In the practice of the present invention, the loose mass of homogenized cut forage crop is compacted into wafers or pellets of substantially uniform size, shape and density in a novel manner. To this end there is provided a wafering mechanism, generally designated 105, which includes means defining a series of die cells of converging cross section from their entrance ends or openings toward their exit ends. The homogenized forage is delivered into juxtaposition with respect to the entrance ends of the die cells, and the juxtaposed portions are continuously forced into the cells so as to form the forage into a pressed mass within the cells. As more and more of the homogenized forage is forced into the die cells, that compressed within the cells is caused to extend beyond their exit ends where it is separated into substantially predetermined lengths.

In the illustrative machine the means defining the die cells of the mechanism 105 includes side plates 106 and 107 and transverse partitions 108 and 109. As shown, the side plates 106 and 107 are disposed in spaced parallel relation to each other and are maintained in such relation by means of through-bolts 110 which mount spacer sleeves 110a (FIG. 13). The partitions 108 and 109 are interposed between the spaced side plates 106 and 107. The inner faces of the side plates 106 and 107 define the transverse walls of the die cells. At their inner ends each of the partitions 108 and 109 are equipped with a longitudinally disposed pin 112, which is extended outwardly beyond the side edges of the partitions for reception in appropriate apertures 113 formed in the side plates 106 and 107.

Inwardly of the pins 112, toward the entrance ends of the die cells, the longitudinal cell walls are defined by tips 114. The tips 114 are preferably formed of hardened steel and present outwardly diverging longitudinal faces. The tips terminate at their inner ends in sharpened edges 114a. Outwardly of the tips 114 the partitions 108 and 109 are arranged in oppositely facing pairs, back-to-back, to the end that their front faces define oppositely disposed longitudinal walls of the die cells which converge. With this converging disposition of the partitions 108 and 109 and the outwardly diverging form of the tips 114, the die cells are of outwardly converging cross section from their openings or entrance ends toward their exit ends.

In the illustrative machine 70, the die cells of the wafering mechanism 105 are radially disposed in an annular arrangement with their inner ends defining the inner periphery of the annulus and their exit ends defining the outer periphery thereof. The wafering mechanism 105 is disposed within the housing 76, and the later can be said to define a wafering chamber. The annular arrangement of the die cells effectively divides the wafering chamber into two parts: the pace within the inner periphery of the annulus as defined by the entrance ends of the die cells comprising an extruder-feed chamber 116; and the space within the housing 76 exteriorly of the annulus comprising a collecting or recovery chamber 117.

The loose mass of homogenized cut hay or other forage crop is transferred from the hopper 75 into the extruder-feed chamber 116. Thus an access opening 118 is formed in the right side wall of the housing 76 and the side plate 107 providing communication between the hopper 75 and extruder-feed chamber 116. Means is provided for conveying homogenized cut forage from the hopper 75 through the opening 118. In the illustrative device this means comprises an auger type conveyor 119. As shown, the conveyor 119 is composed of two helical flights 120 and 121 which are rigid with a shaft 122. The right end of the shaft 122 is journaled in a bearing 123 which is mounted on the right end wall of the hopper 75. The shaft 122 extends coaxially through the extruder-feed chamber 116 and is journaled at its left end within a bearing 124 mounted on the outer end wall 125 which closes that side of the extruder-feed chamber 116 and separates from the collecting chamber 117.

To the right of the shaft bearing 123, shaft 122 mounts the drive belt drum 91. Thus power is transmitted from the main drive sheave 93 to the drum 91 by way of the drive belts 92 to effect rotation of the shaft 122 and with it the auger conveyor 119. As a result the loose mass of homogenized cut forage delivered from the chute 72 by way of the hood 98 into the hopper 75 is transferred into the extruder-feed chamber 116.

Preferably, the auger conveyor 119 is rotated at a relatively high speed, e.g., at a rate of approximately five hundred revolutions per minute. Such operation of the auger conveyor 119 imparts a whirling motion to the mass of homogenized chopped hay so that it is distributed, centrifugally, about the periphery of the extruder-feed chamber 116 over the entrance ends of the die cells.

Means is provided for forcing the homogenized chopped hay that is disposed about the extruder-feed chamber 116 and over the die cell openings into the die cells and against the knife edges 114a to sever the hay that is forced into one die cell from that in the next adjacent cells. For this purpose the exemplary machine utilizes a pair of rollers 127 of substantial mass. The rollers 127, which may have a serrated or a longitudinally ribbed periphery, are carried by a frame which includes a pair of diametrically extending arms 128 disposed within the chamber 116. Centrally thereof the arms 128 are fastened to a spacer sleeve 129 which is keyed to the shaft 122 for rotation therewith.

The rollers 127 as shown are of annular form and are journaled by means of bearings 130 upon hubs 131. The hubs are mounted between the outer ends of the arms 128 and are so located that the peripheral surfaces of rollers 127 traverse a path close to but spaced from the periphery of the chamber 116 as defined by the entrance ends of the die cells indicated by the knife edges 114a.

The hub 131 of each roller is provided with an axial passage 131a which intersects a radial passage 131b. By means of these passages lubricant is introduced into a central annular chamber 131c between the bearings 130. The outer end of the axial passage 131a is equipped with a fitting 131d whereby lubricant can be introduced under pressure to supply the bearings 130. The bearings are equipped with seals 130a to retain the lubricant. To provide access to the interior of the extruder-feed chamber 116 and to the fitting 131d an opening 125a is provided in the wall 125. A door 132, adapted to be held in place as by means of thumbscrews, closes the opening 125a when the machine is in operation.

Because of the nature of the material, that is the chopped forage crop, upon which the rollers act, special provision is made to preclude the entry of dust, dirt, and the like, internally of the rollers with resulting excessive wear and impairment of rotation.

For this purpose, cover plates 133 are interposed between the hubs 131 and the rollers 127. Each of the cover plates 133 is of annular form and internally is fixed to the hub 131. An inwardly projecting flange 133a is provided about the periphery of each plate 133 which is received in a complemental, outwardly facing groove 127a formed in each of the corresponding side faces of the roller 127. The grooves 127a are spaced inwardly of the outer periphery of the roller 127 and outwardly of its inner periphery beyond the bearings 130. Thus a tortuous path is provided which effectively precludes travel of any dirt or the like internally of the roller.

Additionally, the outer peripheral edge of each cover plate 133 is chambered, as indicated at 133b. Thus there is provided a surface that is directed angularly outwardly with respect to each of the rollers 127. Dirt particles impinging upon the outer surfaces of the rollers 127 are thus directed away from the narrow, exposed portion of the grooves 127a so that the possibility of the re-entry of such particles is minimized.

It is to be noted that the flights 120 and 121 of the auger conveyor 119 terminate at the opening 118 into the extruder-feed chamber 116. To the end that the loose mass of cut hay is delivered into those portions of the chamber 116, between the rollers 127 and their supporting arms 128, and the entry of the hay is not impeded thereby, the supporting arms are fixed to the shaft 122 in angularly offset, trailing relation with respect to the terminal edges of the auger conveyor flights (FIG. 10).

It will be apparent that variations in the rate of delivery of the homogenized forage will occur. This might, for example, be due to variations in the quantity of hay from place to place along a windrow, and at times a very large mass of material might suddenly enter the chamber 116. To insure that the homogenized forage is delivered into proximity juxtaposition with the openings or entrance ends of the die cells, means is provided to press the forage toward the periphery of chamber 116 in advance of the rollers 127. In the illustrative device, this means comprises a pair of vanes 135 and 136 which are respectively fixed to the terminal face portions of the flights 120 and 121 of the auger conveyor 119. As shown, each of the vanes 135 and 136 is of arcuate form and extends into the chamber 116 on opposite sides of the arms 128. Each vane presents a smooth outwardly facing forage-engaging surface oppositely disposed to the die cell entrances. The leading edge portion of the vanes 135 and 136 are located in closely spaced relation to the central portion of the arms 128 while their trailing edges terminate adjacent the leading portions of the peripheral surfaces of the rollers 127. The trailing edge portions of the vanes 135 and 136 are spaced from the periphery of the chamber 116 a distance less than that between the periphery of the chamber 116 and the axes of the rollers. As the homogenized cut forage is impelled into the chamber 116 it is engaged by the vanes 135, 136 and is urged by them outwardly toward the periphery of the chamber, over the die cell openings. The material is delivered by the vanes sufficiently close to the periphery of the chamber 116 that, when the forage is engaged by the rollers 127, such engagement occurs outwardly of planes passing through the roller axes perpendicular to the arms 128. Thus, even when a large mass of the homogenized cut forage enters the chamber, it will not be pushed about the chamber by the rollers and arms but will be promptly pressed by the rollers toward the die cell entrances.

Means is provided to assist in holding the homogenized forage in place over the entrance ends of the die cells and against movement peripherally about the chamber 116. As shown, for this purpose holding rings 138 and 139 are provided on opposite sides of and about the periphery of the extruder-feed chamber 116. The rings 138 and 139 extend inwardly of the die cell side plates 106 and 107 and their inner edges are notched to provide an annular series of teeth 138a and 139a respectively, for engagement by forage. The plates are stationary and thus their teeth tend to preclude precession of the chopped forage about the chamber 116.

From the foregoing it is apparent that with each pass of a roller 127 over a die cell opening, the homogenized forage juxtaposed with the opening is pressed outwardly, the outermost layer of that forage about the periphery of the extruder-feed chamber 116 is best forced into the entrance end of the die cell and that intervening between adjacent cells is forced against the extremities of the tips 114. As the shaft 122 continues to rotate, more cut forage is introduced by the conveyor auger 119 into the chamber 116 by centrifugal force and by the action of the vanes 135 and 136 the additional forage is directed toward the periphery of the chamber and is deposited upon the forage that preceded it. Successive passes of the rollers 127 result in successive applications of force to the forage crop in the die cell entrances and in the die cells themselves. The result is that the homogenized forage is continuously forced from the extruder-feed chamber 116 into the die cells and it is separated from that in adjacent cells by the cutting action of the knife edges 114a.

To facilitate this cutting action, the trailing surface portions of the tips 114 with respect to direction of rotation of the rollers may be relieved just rearwardly of their edges 114a. However, it will be apparent that full tip surfaces can if desired be relieved. Such a tip is shown in FIG. 24. There a tip 140 has both its leading and trailing surfaces similarly relieved to define a cutting edge 140a between adjacent die cells.

As hereinbefore noted, the die cells are of converging or diminishing cross-section from their openings or entrance ends toward their exit ends. Thus as the forage progresses through the cells upon successive passes of the roller 127 to force more and more forage into the entrance ends of the cells, the forage too is reduced in cross-section by the action thereupon of the cell walls. As a result the forage becomes compressed.

The rate at which the cross-sectional area of the die cells diminishes or converges affects the density of the product, the forage wafer or pellet, formed therein. To obtain density control, means is provided for varying the cross-section of the die cells. In the illustrative device cross-section alteration is accomplished by varying the spacing between the longitudinal cell walls 108 and 109. As noted earlier herein the walls 108 and 109 are arranged in pairs back to back, and at their inner ends they are mounted upon pivot pins 112 received in apertures 113 in the side walls 106 and 107. Means is provided to rock the plates 108 and 109 upon the pivot pins 112. Preferably this means is disposed between the back-to-back pairs of walls 108 and 109 which is effective to urge the walls apart and thereby urge together the front surfaces of the opposed walls of each die cell. Referring particularly to the first form of the device shown in the drawings this means comprises a pressure fluid actuator in the form of piston and cylinder 144, 145 interposed between the outer ends of the back-to-back pairs of the die cell walls 108 and 109. As shown, the cylinders 145 are carried by the walls 108 and the pistons 144 engage the walls 109. Pressure fluid supplied to the cylinders urges the pistons 144 outwardly and therefore tends to spread the walls apart. So long as pressure fluid is supplied to the cylinders 145 the walls are urged in a direction to resist the force exerted thereon by the compacted forage crop that is being expressed through the die cells.

Provision is made for forming wafers or pellets of uniform density in all of the die cells. This is achieved in the present construction by supplying pressure fluid to the cylinders 145 simultaneously and from the same source. Thus in the illustrative device all of the cylinders 145 are supplied from a common manifold 146 having suitable individual connections 147 therewith. Pressure fluid is delivered to the manifold 146 from a sump 148 by way of a pump 149, and from the pump 149 by way of a supply line 150. Interposed in the supply line is a pressure regulating valve 151 by means of which the fluid pressure can be controlled. The supply line 150 also incorporates a two-position valve 152 which controls the supply of pressure fluid to the manifold 146. In its "on" position, fluid flow through the supply line to the manifold is permitted. In the other or "off" position of the valve 152, supply of pressure fluid through the line 152 is interrupted. In this latter position of the valve 152, pressure fluid delivered from the pump 149 into the line 150 is diverted by the pressure regulating valve 151 through a bypass line 153 to a return line 154. At the same time, when the control valve 152 is moved into its "off" position, fluid pressure in the manifold 146 and cylinders 145 is relieved by way of the valve 152, a bypass line 155 to the return line 154.

It will be apparent from the foregoing, therefore, that the same fluid pressure is applied simultaneously to each of the pistons and cylinders 144, 145 and as a result equal force is applied by the longitudinal walls 108 and 109 to the forage crop within all of the die cells. In the event that the force exerted upon the movable walls by the material within one cell diminishes, the longitudinal walls of that cell are moved toward each other, reducing the cross-section area of the cell and restoring the compressive force upon the material in that cell. Similarly, if such force should increase in one cell, the walls of that cell are moved apart, thereby increasing the cell cross-section and again restoring the compressive force upon the material in that cell.

To preclude collection of stray particles of forage between the back-to-back pairs of longitudinal cell walls 108 and 109, a filler 108a of resilient material, such as soft sponge rubber or polyurethane foam, is inserted therein. Thus, interference with movement of the long cell walls 108 and 109 in the direction to increase the cell cross-section is prevented.

The pump 149 is also used to supply pressure fluid for moving the chute 72 and flail 84 between operating and transport position. For this purpose a separate supply line 157 is interconnected between the pump 149 and the cylinder of the lift 96. The supply of pressure fluid through the line 157 is controlled by a two-position valve 158. With this value in one position, "on," flow of pressure fluid from the pump 149 to the cylinder of the lift 96 is permitted. In its other or "off" position, fluid pressure in the lift cylinder is relieved by a dumping line 159 which is interconnected between the valve 158 and the return line 154. It is contemplated that with the valve 158 operated in its "off" position so as to relieve pressure fluid in the cylinder of the lift 96 that the weight of the chute 72, flail 84, and the associated components will restore the chute and flail to operating position from transport position.

As more of the homogenized forage crop is compacted into and through the die cells, it is caused to extend through the outer or exit ends into the product conveyor or collecting chamber 117. Therein means is provided for dividing the mass of compressed forage crop that moves outwardly from each of the die cells into substantially predetermined lengths. For this purpose in the illustrative device there is provided a deflector plate 160 adjacent the exit end of each of the die cells. Each of the deflector plates 160 as shown is of generally Y-shaped cross-section and includes a mounting leg 160a and a deflector leg 160b. The mounting leg 160a of each deflector 160 is equipped with a bolt 161 which is received in a slot 162 formed in the inner side wall of the wafering chamber 76. The slots 162 as shown are radially disposed with respect to the annular arangement of die cells. Thus, by this construction, adjustment of the positions of the deflector legs 160b of the deflectors 160 with respect to the exit ends of the die cells is provided.

Upon reference to FIG. 25 it will be seen that as the compacted forage is extended from the exit end of the die cell there shown beyond the side walls 106 and 107 and from between the longitudinal walls 108 and 109 of the cells, such movement continues until the outer right edge of the wafer engages the deflector 160. As a result, the compacted forage is directed toward the left and is separated from succeeding compacted forage as indicated at 164. This action is repated with succeeding compacted forage as it is expresed through the die cells. Thus there are formed wafers or pellets of substantially uniform length as predetermined by the relative location of the deflectors 160 with respect to the exit ends of the cells.

After the compacted forage wafers have been separated, they fall within the collecting or recovery chamber 117 of the housing 76 toward the bottom thereof where they are collected by the conveyor 78. The conveyor 78 is of endless form and includes a series of transverse flights 165 which project outwardly and extend transversely between a spaced pair of endless chains 166. The chains 166 are trained about suitable guide wheels 167 and driven by engagement with a sprocket wheel 168. The lower end of the conveyor 78 extends into the lower portion of the recovery chamber 117 beneath the wafering mechanism 105 and thus is in position to receive the compressed forage wafers or pellets. The conveyor 78 elevates the compressed forage wafers from the recovery chamber 117 by engagement with the conveyor flights upwardly and rearwardly for discharge into the trailed wagon 79.

As the wafers are conveyed, some bits and pieces may become separated therefrom. Such bits and pieces are refered to as "fines." It is desirable not to waste the fines but to recover them. For this purpose the illustrative machine incorporates means for collecting the fines and returning them to the hopper 75. As shown, the divider partition 78a over which the flights 165 of the conveyor carry the compressed forage wafers is provided with a grating 170. The grating 170 may conveniently take the form of a laterally spaced series of longitudinal rods. Fines carried by the conveyor drop through the grating 170 and are directed by the bottom wall of the housing of the conveyor 78 to a cross feed auger 172. The cross feed auger delivery is enclosed within a housing 173 that extends transversely beneath the conveyor 78. The fines are delivered to the hopper 75 by means of a return auger 174 that is interposed between the housing 173 and the hopper. When the fines reach the hopper 75 it will be apparent that they are co-mingled in the loose mass of homogenized cut forage being delivered into the hopper from the chute 72 and hood 98. Therewith they are introduced into the extruder-feed chamber for inclusion in the subsequently formed wafers.

To drive the conveyor 78 in this instance, the sprocket 168 is rigid with a shaft 175 which mounts a sheave 176 on its outer end. The sheave 176 is adapted to be driven from the shaft 122 by way of a drive pulley 177a, an intermediate transfer pulley 178 and drive belts 179 and 180 interposed between the sheave and the pulleys. To operate the cross feed conveyor 172, the same is equipped at its outer end with a sheave 182 which is engaged by a drive belt 183 interposed between it and the sheave 177b that is fast on the shaft 122. The return auger 174 is driven from the pulley 172 by means of a shaft 185. The shaft 185 extends transversely beneath the cross feed auger housing 173 upon which it is journalled at suitable bearings. At one end its mounts a drive pulley 186 which is connected to the cross feed auger pulley 182 by a drive belt 187. At its opposite end the shaft 185 enters a gear box 188 which contains suitable bevel gearing (not shown) for transmision of power to rotate the return feed auger 174.

The illustrative machine incorporates means for the addition of moisture to the homogenized cut forage upon which it is operated. This moisture may comprise ordinary tap water but it will be apparent that other solutions such as those containing preservatives, dietary supplements, binders, and the like, can also be similarly introduced. The pneumatic mixing to which the chopped forage crop is urged by its entrainment in the air stream upon delivery from the flail 84 through the chute 72 insures thorough distribution of such additives throughout the loose mass of forage.

As shown, provision is made for the introduction of moisture into the loose forage mass as it enters the hopper 75. For this purpose the hopper 75 is equipped with a series of nozzles 190 (FIGS. 2, 7 and 19). In this case, the nozzles 190 are arranged in two rows, one of which is mounted on each end wall of the hopper 75, and the nozzles in each row are spaced apart one from the other. The exemplary machine 70 carries its own moisture supply which is contained in a tank 192 conveniently fashioned by boxing in the forward portion of the implement frame 73. As shown, the tank 72 is equipped with a clean-out door 192a. Fluid contained in the tank 192 is withdrawn therefrom by a pump 193 by way of a supply line 194. The pump happens in this case to be of the rotary impeller type and it is driven by a belt 193a from a sheave 177c from the drive shaft 122. The belt 193a engages a sheave 193b that is fixed to the pump shaft (FIG. 19). Fluid is delivered by the pump 193 via a supply line 195 and a flow control valve 196 to a manifold 197 for distribution to the nozzles 190. The manifold 197 is equipped with a series of valves 198, an individual valve being provided to control the supply of fluid to each of the nozzles 190. Thus between each of the nozzles 190 and each of the valves 198 an independent fluid connection 199 is made. Desirably the valves 198 are solenoid operated. Thus each includes a coil (not shown), one end of which is grounded and the other end of which is connected to a suitable power source such as a battery 200 by wires 201. Each of the wires 201 incorporates its own "on/off" switch 202 so as to provide for independent operation of the valves 198.

For convenience of control of all of the functions of the machine by an operator from the seat of the tractor 71 which is used to draw the implement along the hayfield, a control column 204 is provided. The control column 204 is adjustably mounted on the forward end of the frame 73 and extends forwardly and upwardly and at its outer end mounts a control panel 205. Upon this control panel 205 are mounted the solenoid valve control switches 202, the fluid pressure regulating valve 151, the die fluid control valve 152 and the lift operating valve 158. Similarly the operating lever 95 for the clutch 94 is supported by means of a suitable bracket so that the hand grip portion 95a, too, is disposed adjacent the control panel 205. Thus, substantially all of the controls and adjustments are readily accessible to the tractor operator.

The method by which the chopped forage is deposited in increments at the entrance to the dies and then forced successively therethrough causes the wafers of the present invention to be formed in a series of layers or laminations of compressed hay, wherein the majority, but by no means all, of the fibers, i.e., stems and leaves, tend to be oriented in the same direction. That direction is normal to the axis of the rotating compression roller and appears to be the direct result of the rotary motion of that roller in the cylindrical extruder-feed chamber 116.

Due to the manner in which the successive increments of chopped forage are compressed in the die, the layers of forage—as best observed in FIGS. 21–25, inclusive— are formed in the dies in a somewhat arcuate or curved shape with the apex of the curve being in the direction away from the extruder-feed chamber 116 and with the edges of each successive increment or layer trailing the principal plane of the lamination at an angle. The trailing edges of each successive layer are compressed and bonded to the trailing edges of those in front and in back thereof by the pressure of the roller. The result is additional structural strength in the wafers because of the merging under pressure of layer upon layer in these additional planes as well as in the main plane of the wafer which is essentially normal to the walls of the die cells.

The pressure of the rotating roller against the chopped forage is sufficient to compact each successive increment of the material firmly to that which has preceded it into the die. The pressure of compaction expresses certain materials from the fibers which may be generally referred to here as plant juices and plant protoplasm. This expressed material appears to serve as a mortar or cement increasing the overall strength of the wafers and also increasing the platability to the animal.

An especially advantageous result of the alignment of fibers and incremental laminations is that the length of compacted mass of forage may be readily subdivided into wafers, without the necessity of a cutting action, having essentially uniform sizes and shapes and with substantially parallel ends as well as sides.

The pressurized, movable sections of the dies results in a uniformity of density in the wafers of the invention unmatchable by any other method of compressing forage. Thus, the density of the wafers produced by this method is more uniform throughout each wafer and, indeed, throughout a wagonload of wafers than is possible by any known method. Uniformity of density is important because it is desirable to feed the animals a product of consistent properties and because it affords a product of greater stability and strength with resultant minimum breakage in handling.

In FIG. 27 there is shown a modified form of a hopper, extruder-feed chamber, and means for expressing the chopped forage through the die cells of the wafering mechanism, such arrangement also embodying the present invention. The hopper for receiving the chopped forage crop includes an end wall 310 and a lower portion 311 and an upwardly flared or entrance portion 312. The right end wall of the extruder-feed chamber is defined by a ring-shaped plate 313 to which the hopper portions 311 and 312 are joined. The left side wall of the extruder-feed chamber in this form of the device is defined by a disk 314. The disk 314 mounts a hub 315 within which is journalled a shaft 316. As indicated at 317 there is keyed to the shaft 316 a hub 318. Rigid with the hub 318 is an arm 319 which extends radially outward from the shaft. The outer end 320 of the arm 319 has affixed thereto by a suitable machine screw 321 a knocker or cutoff blade 325. Radial adjustment of the position of the blade 324 is effected by engagement of the screw 321 within a slot 322 formed in a lug 323 that is rigid with the blade 324. Thus it will be apparent that in this modified form of the invention, the blade 324 serves to sever compacted forage extruded from the wafering mechanism and can be so adjusted as to form directly relatively thin wafers. For this purpose the blade 324 can, if desired, be sharpened as indicated by the knife edge 325 (FIG. 28). It is also contemplated in this form of the invention that the shaft can be rotated by the application of power thereto by a suitable coupling 326 at the outer or lift end of the shaft 317. Within the wafering mechanism the shaft 316 mounts a spacer 328 which is non-rotatably secured thereto. Attached to this spacer are diametrically extending arms 320. Adjacent their outer ends and extending between them are pins 330 which respectively mount rollers 331 for free rotation thereon. As indicated at 332 the peripheries of the rollers may be serrated. To lubricate the rollers, grease fittings 333 are provided which are accessible on the right-hand side of the roller mechanism. The shaft 316 mounts the flights 334 and 335 of a helical conveyor for directing chopped hay in the direction indicated by the arrow 336 from the hopper to the rollers. The conveyor flights 334 and 335 terminate as indicated at 337 and 338, respectively, adjacent the roller mechanism and the terminal ends 337 and 338 and are so disposed with respect to the roller arms 329 that material conveyed thereby from the hopper is introduced into open spaces 339 and 340 at the sides of the arms 329 and ahead of the rollers 331. The side plates 313 and 314 are held in spaced relation by a series of bolt and nut assemblies 341 which also serve to support the hollow die cell structures therebetween. In this form of the invention, the die cells are of unitary construction comprising side walls 342, end walls 343 and an intermediate centrally disposed partition 344. The central partition 344 is provided with a sharpened inner end portion 345. In this form the side walls 343 that are disposed adjacent the supporting plates 313 and 314 are arranged in outwardly converging relation. As in the previously described form, the die cell units are placed all around the hollow annular space between the plates 313 and 314.

In FIG. 30A there is illustrated yet another from of die cell structure. There the die cells defined by this structure include side walls 342 and end walls 343. However, instead of a single partition 344 disposed between the end walls, a greater number of partitions 346 are provided so as to divide the cell structure into a plurality of individual cells for the formation of the chopped forage crop into wafers or pellets of smaller cross-sectional area.

Turning now to FIG. 31, there is shown a forage harvester machine also embodying the invention and having a semi-cylindrical casing 410 housing a flail type forage crop chopper which includes chopping blades 411. The chopping blades 411 impel the cut and chopped forage upwardly through a chute 412 and into a spout element 413 for delivery into a trailing chute element 414 for delivery over an aerator 415 into windrows. The machine incorporates means generally indicated at 416 for rotating the spout 413 and the delivery elements 414 and 415 so as to orient the windrows as desired.

By removing the spout and delivery elements 413, 414, 415 and replacing them with a hood 417 and a duplicator 418 having an open end portion 419, the forage harvester of FIG. 36 can be modified for delivery directly into a wafering machine. In such instance the harvester comprises the pickup, rechopping and homogenizing mechanism corresponding to the rotary flail 84, chute 72, and hood 98 of the first form of machine hereinbefore described. As shown, the forage harvester of FIG. 31 can be equipped for operation from the power takeoff of a conventional tractor (not shown) for effecting rotation of the flail.

When the harvester is modified for use as a windrow pickup, a draft connection is provided between its ground engaging wheels 420 as indicated at 422 and 423. The pelleting or wafering machine includes a platform 424 which is supported upon ground engaging wheels 425 and because of the power requirements there is provided upon the platform 424 an engine 426. Power from the engine is delivered by way of a shaft 427, pulley 428, drive belt 429, drum 430, to a shaft 431. The shaft 431 mounts an electrical conveyor or auger 432 which is disposed within the casing 433 of the hopper 434.

The hopper 434 includes side walls 435 and end walls 436 and 437. Situated within the hopper 434 and extending transversely thereof is a deflector partition 438 which is disposed in rearwardly and downwardly inclined position, terminating in spaced relation to the hopper side wall 437 to define an opening 439. Thus the partition 438 serves to direct the chopped forage crop delivered into the hopper toward the opening 439 for delivery to the conveyor 432. The conveyor 432 is of double helical form and affixed to the flights thereof are vanes or flanges 440. The flanges 440 are shaped and pitched to press the chopped forage delivered by the conveyor 432 about the periphery of the wafering mechanism.

As in the forms previously described, the wafering mechanism of this form of the invention includes a pair of spaced arms 441 mounting roller pins 442 upon which are journalled serrated rollers 443. In this form the inner side walls of the pellet-forming die cells are defined by a side plate 444 and the die cell structures are secured thereto by means of through bolts 445. The entrance ends of the die cells 447 communicate with the extruder-feed chamber to permit compacting of the forage crop therein by action of the serrated rollers 443. Outwardly of the exit ends of the dies in the side walls 444 are extended as indicated at 448 and opposite the exit ends of the die cells the plate portions 448 are provided with a series of readily extending slots 449 (FIG. 35) in each of which is received a mounting bolt 450 for supporting break-off plates 451, the latter having angularly outwardly disposed wafer engaging legs 452.

As in the die cell structure of FIGS. 27–30, the die cells in this form may, if desired, be equipped with thin central partitions 453 terminating at their inner ends in knife edges 454. Similarly the wall structure between adjacent die cells terminates in sharpened tips 455. Rearwardly of the tips 455 are pivot pins 456 journaled between the right plate portions 444 and an outer side plate 457. Carried by the pivot pins 456 are movable longitudinal wall sections 458 arranged in back-to-back relation in the form shown in FIGS. 34–36. Means is included for urging the longitudinal wall members 458 away from each other to thus reduce the cross-section of the die cells which the tips 455 and the wall members 458 define. In this instance, such means includes hollow diaphragms 459 for the reception of pressure fluid. Pressure fluid is supplied within the diaphragms 459 by way of fluid connections 460 from a common manifold 461 adapted to be coupled at 462 to a source of pressure fluid.

From the die cells, compact wafers or pellets of chopped forage are collected in a chamber 463 and the wafers fall into the lower portion 464 of the chamber where they are received upon a conveyor 465. The latter is of the endless belt type and is trained over intermediate pulleys 466 and a drive sprocket 467. The drive sprocket 467 is driven by means of a belt 469 from a pulley 470 that is fast on the shaft 431. From the lower collecting chamber portion 464, the conveyor is enclosed within a housing 471 extending rearwardly and upwardly from the lower portion 464 of the collecting chamber 463. From the housing the compacted forage wafers are discharged at 472 into a trailed wagon or other receiver generally designated 473. So that the wagon 473 can be drawn by the same tractor that draws the pickup device and the wafering machine, its tongue 474 is shown as being connected to the rear end of the wafering machine platform 424 by a suitable draw bolt 475.

This form of the invention, too, contemplates the introduction of moisture into the loose mass of chopped forage delivered to the wafering machine. For this purpose, the engine 426 has an outwardly extending shaft 476 drivingly connected to a pump 478 by a belt drive 477. Moisture is supplied to the pump 478 from a tank 479 mounted upon the platform 424 by way of a line 480. From the pump 478 fluid is delivered through a line 481 to a Y-junction 482 which supplies delivery pipes 483 and 484, the outer ends of which are equipped with spray nozzles 485. The nozzles 485 are mounted upon the hopper 433 and are directed inwardly thereof so as to spray moisture upon the loose mass of chopped forage received therein.

In examining FIGS. 35 and 36, it will be apparent that if the chopped forage crop passes too freely through the die cells the force exerted thereby on the cell walls 458 will be reduced. Under these conditions, and since a constant fluid pressure is exerted against the opposite sides of the cell walls by the diaphragms 459, the cell walls will be moved inwardly until the cross-sectional area of the cell is sufficiently restricted to automatically restore the force applied to the sides of the compacted forage being expressed through the cell. Substantially constant force upon the forage within the cells is thereby assured, precluding passage of the material in improperly bonded form. Because the diaphragms 459 are interconnected by way of the manifold or pressure ring 461 which in turn is supplied from a single pressure fluid source the force exerted by the diaphragms against the abutting portions of the longitudinal walls 458 of the die cells all around the die cell annulus remains constant and uniformly dense wafers of the compacted forage are produced.

In FIG. 37 there is illustrated an alternative means for operating the movable walls 458 of the die cells. As shown this means incluldes a cam member 490 interposed between the movable wells 458. The cam member 490 is rigid with a lever 491 and to the remote end of the lever is connected a spring 492. The spring is of predetermined tension and its other end can be attached to any suitable fixed part of the machine. Thus this alternative arrangement serves to effect movement of the walls 458 mechanically.

Figure 39:
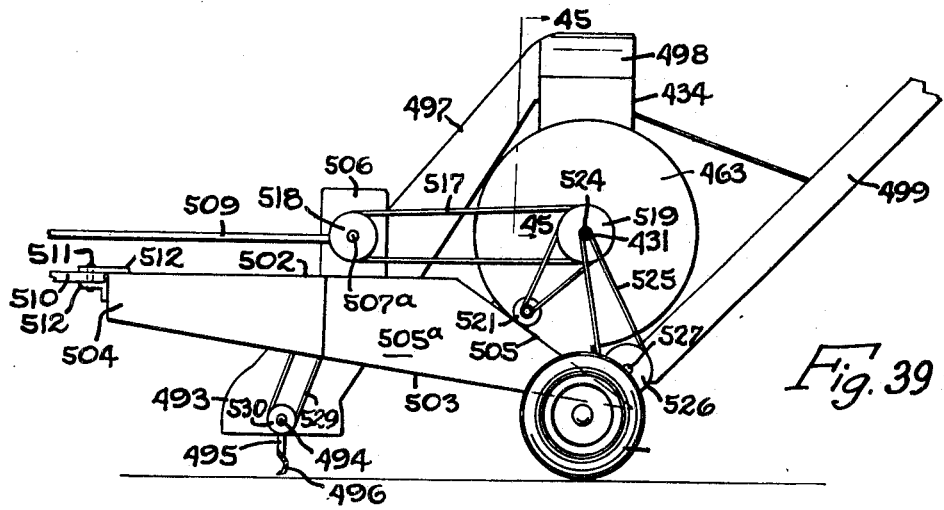
FIG. 39 is a left side elevation of the machine shown in FIG. 38.
Figure 40:
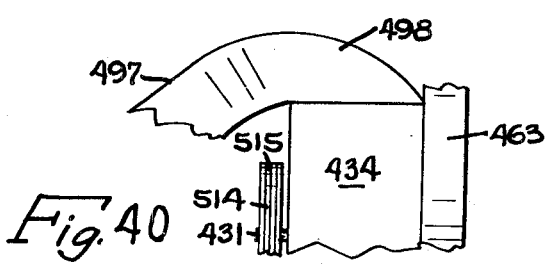
FIG. 40 is a fragmentary front elevational view taken substantially along the line 40—40 of FIG. 39.

In FIGS. 38–40 there is illustrated a further modified machine incorporating features of the present invention. Therein the flail type pickup is enclosed within a housing 493 across which extends the flail wheel 494 mounting the radially positioned hammers 495 which are equipped at their outer ends with scooped chopping blades 496. The flail chopper delivers the chopped forage crop into an upwardly inclined chute 497 through which the loose chopped forage is thoroughly mixed and is delivered into a crossover housing portion or hood 498 for delivery into a hopper 434. This hopper is similar to that hereinbefore described and includes a helical conveyor 432 carried upon a shaft 431 for delivery to a wafering mechanism enclosed within a housing 463 in which housing the compacted masses or wafers of the forage crop are formed collected and from which they are delivered by way of an elevating conveyor 499 which includes a belt 500 mounting transversely disposed and upwardly projecting flights 501. As in the first form of the invention hereinbefore described, the supporting frame or platform of this form of illustrative machine is boxed-in to define a tank. Thus the tank includes a top wall 502, a bottom wall 503, end walls 504, 505, and side walls 505a. Associated with the tank thus formed is a piping and pumping arrangement similar to that described in connection with the form of the invention shown in FIGS. 32 and 33 for conveying moisture into the hopper 434.

Figure 43:
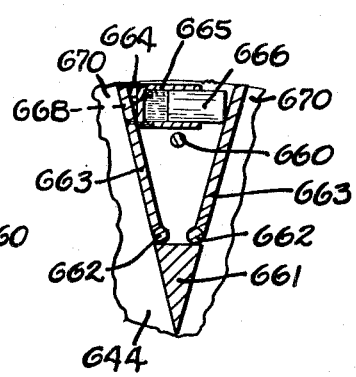
Figure 44:
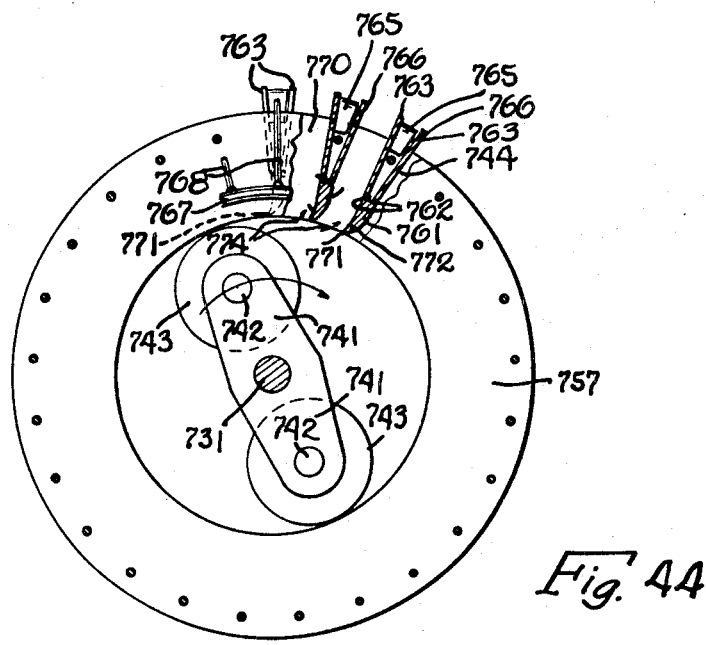
FIG. 44 is an end view of a portion of yet another form of machine embodying the present invention, with fragmentary sections.
Figure 45:
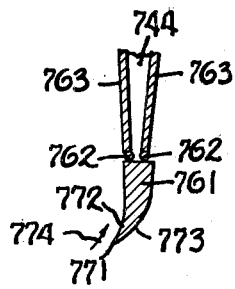
FIG. 45 is an enlarged detail taken from FIG. 45.

The form of the invention illustrated in FIGS. 43–45, like the forms previously described, incorporates its own power source. Thus an engine 506 is provided mounted upon the top wall 502 of the fluid tank. Power from the booster engine 506 is delivered by way of a main drive shaft 507. Power is also supplied from the power takeoff of a tractor pulling the machine by way of a P.T.O. shaft 509 which drives a power shaft 507a by way of a gear case 508. Incidentally, a draft connection to the tractor is indicated at the forward end of the machine and includes the tractor draw bar 510 which is attached by a draw bolt 511 between draft lugs 512 that are secured to the wafering machine.

The booster engine 506 acts to provide additional power for the unit. Thus the engine shaft 507 mounts a main drive pulley 513 from which power is coupled to the auger and pelleting roller shaft 431 by way of multiple drive belts 514 and a drum 515 that is secured to the shaft 431. The opposite end of the shaft has secured thereto another drive pulley 516 which in turn is adapted to be driven through a multiple drive belt 517 from a pulley 518 carried by the shaft 507a. Also attached to this end of the shaft 431 is a pulley 519 which engages and drives a belt 520 to operate a pump 521 for the aforesaid moisture supply arrangement.

Yet another drive pulley 524, substantially smaller in diameter than the pulleys 516 and 519, is affixed to the shaft 431. The pulley 524 engages a belt 525 that, in turn, engages a sheave 527 by means of which power is supplied to drive the conveyor belt 500.

Power for rotating the flail pickup shaft 494 is derived from the shaft 507 of the booster engine 506. For this purpose, the shaft 507 has mounted at the outer end thereof a multiple pulley 528 about which are trained drive belts 529 extending thereto from a multiple sheave 530 that is non-rotatably secured to the corresponding end of the flail shaft 494.

Figure 42:
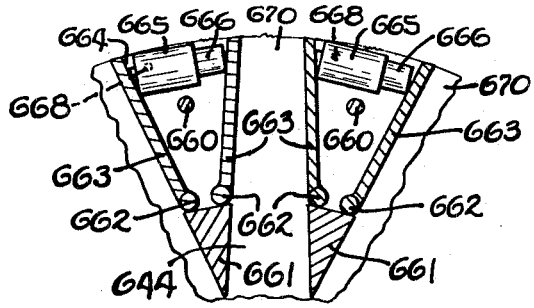
FIGS. 42 and 43 are enlarged sectional views based upon FIG. 41 and illustrative of modified die cell wall construction.
Figure 41:
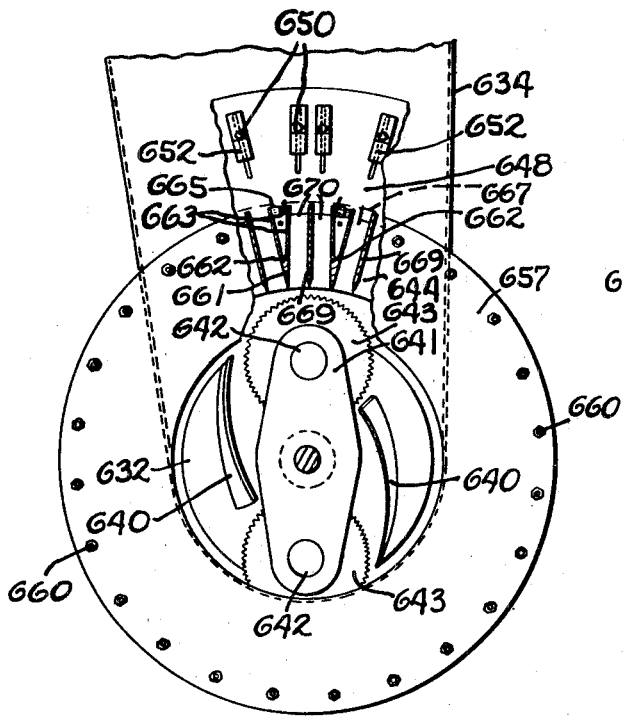
FIG. 41 is a view similar to FIGS. 28 and 35 but showing yet another modification.

Still another modification of a pellet or wafer-forming device is depicted in FIGS. 41–43. As there shown, the device includes an auger type conveyor 632 housed in the lower portion of a hopper 634 into which a loose mass of homogenized chopped forage crop is introduced. As in previously described forms, the auger conveyor mounts vanes 640 for urging chopped forage delivered by the auger 632 peripherally outward about the extruder-feed chamber. The auger shaft mounts a supporting arm 641 that extends diametrically therefrom within the extruder-feed chamber and at the outer ends of the arm are longitudinally disposed pins 642 upon which are journaled compacting rollers 643. The die cells of this wafering mechanism are disposed between circular side plates 644 and 657. Adjacent die cells are separated by tips 661 of generally triangular cross-section defining sharp edges at the entrance ends of the die cells. Supported on pivot pins 662 are longitudinal side wall plates 663. Interposed between the back sides of the pairs of longitudinal cell wall plates 663 are actuators in the form of cylinders and pistons 665 and 666. The latter are adapted to be supplied with pressure fluid from a ring-shaped manifold 667, indicated in dotted lines in FIG. 41, by way of inlet ports 668. This construction and arrangement, too, insures that the longitudinal walls of the die cells 670 are forced by constant pressure inwardly of the cells in case the force exerted by the compacted forage on the opposite faces of the walls decreases, thereby restricting the die cell openings and insuring the formation of pellets of substantially uniform density. This form of the invention, as well as the forms described earlier herein, contemplates the provision of break-off plates 652 mounted upon the outwardly extending portions 648 of the inner side plates 644 by means of bolt-in-slot mountings 650.

A still further modified form of wafering mechanism is shown in FIGS. 44 and 45. The wafering mechanism there shown includes a drive shaft 731 to which is affixed diametrically extending arms 741 carrying pins 742 adjacent the outer ends thereof. Upon the pins 742 are mounted compacting rollers 743. Between spaced side plates 744 and 757 are disposed partition structures defining with the side plates die cells 770. These partition structures include pivot pins 762 upon which are mounted longitudinal cell wall plates 763 rearwardly of tip portion 761. The tip portions 761 define the entrance ends of the die cells 770. As in the forms of the invention heretofore described, cylinder and piston means 765, 766 are interposed between the back-to-back longitudinal wall plates 763 adjacent the outer ends thereof for controlling the density of wafers of compacted forage formed in the die cells 770. The cylinders 765 are supplied from a pressure fluid manifold 767 by way of connecting lines 768 interposed between the manifold 767 and the cylinders 765.

In this form, the tips 761 are specially formed to facilitate entry of the chopped homogeneized forage crop into the die cells 770. Thus adjacent their outer ends the tips 761 are curved in a direction opposite that of the rotation of the compacting rollers 743 as indicated by an appropriate arrow in FIG. 44. Thus, the innermost edges of the tips 761 terminate in rearwardly projecting knife edges 771. The knife edges 771 are merged smoothly into the body portions of the tips 761 by curved surfaces. The leading curved surface is designated 772 and is concave.

The homogenized chopped forage which is impelled about the extruder-feed chamber of the pelleting mechanism into juxtaposed position with the openings or entrance ends of the die cells 770 is compacted by the rollers 743 in the areas 773 in a direction indicated by the arrow 774. It thus engages the concave surfaces 772 which serve to direct the material more rapidly into the die cells 770.

The oppositely disposed convex tip surface 773 provides a relieved area behind the knife edges 771 to facilitate its cutting action. It has been found that wafering mechanisms embodying die cell wall structures incorporating tips of this configuration require less power to effect their operation.

In FIG. 46 there is fragmentarily shown a further modified wafering mechanism which includes a main drive shaft 816 mounting roller support arms 829 between which are journaled rollers 831 for rotation about an extruder-feed chamber 832. The entrance ends of the die cells are defined by inward extensions of side plates 813 and 814. The latter are of converging cross-section as effected by inward convergence of side wall partitions 843. The partitions 843 are suitably held in place upon the side plates 813 and 814 by through bolts 831. In this embodiment of the invention, it is to be noted that the axial dimension of the compacting rollers 831 is less than the corresponding dimension of the entrance end of the die cell, i.e., the distance between the inner end of the side plate 813 and the adjacent surface of the side plate 814. These relative dimensions leave a space 810 between each transverse face of the roller 831 and the corresponding adjacent portions of the surfaces of the side plates 813 and 814.

During operation of a machine incorporating this wafering mechanism the homogenized chopped forage crop is urged about the extruder-feed chamber 832 and into the die cells. The resultant wafers are formed as a result of successive passes of the compacting rollers 831 in a series of laminations 811. It will be also noted that these laminations when pressed together acquire inwardly bent side portions 812. Due to the spaces at 810, there is provided substantially firmer binding action along the edges of the laminations and along the entire sides of the compacted forage wafers or pellets thus formed. This is due to the fact that the inwardly extending portions 812 are interengaged substantially as shown in the fragmentary enlarged view comprising FIG. 47, and also to the fact that the central portions 811 and the edge portions 812 are nested one within the other.

While the invention has been described earlier herein in connection with a flail type forage chopper, it will be appreciated by those skilled in the art that other pick-up devices can, under certain conditions, be employed with equal facility for gathering the forage crop and delivering it to the wafering mechanism. By the same token, it will be appreciated that, for certain applications, preliminary homogenizing of the crop material may be dispensed with and reliance placed on the wafering mechanism for mixing the material and severing the longer fibers.

I claim:

1. The method of wafering hay which comprises the steps of:
   delivering successive increments of hay entrained in air to a conveying mechanism;
   conveying the hay to the entrance of a series of adjacent die cells;
   applying force successively to the increments of hay opposite the entrances of the die cells;
   and compacting the hay into and through the die cells thereby forming the hay into compressed laminar wafers.

2. The method of wafering hay which comprises the steps of:
   chopping the hay and co-mingling the stems and leaves thereof;
   delivering successive increments of chopped hay entrained in air to a conveying mechanism;
   conveying the hay to the entrances of a series of adjacent die cells;
   applying force successively to the increments of hay opposite the entrances of the die cells;
   and compacting the hay into and through the die cells thereby forming the hay into compressed laminar wafers.

3. The method of wafering hay which comprises the steps of:
   cutting standing hay;
   placing the cut hay in a windrow;
   picking up the windrowed hay;
   chopping the hay and co-mingling the stems and leaves thereof;
   delivering successive increments of chopped hay entrained in air to a conveying mechanism;
   conveying the hay to the entrances of a series of adjacent die cells;
   applying force successively to the increments of hay opposite the entrances of the die cells;
   and compacting the hay into and through the die cells thereby forming the hay into compressed laminar wafers.

4. The method of wafering hay which comprises the steps of:
   chopping the hay and co-mingling the stems and leaves thereof;
   adding a moistening agent to the chopped hay;
   delivering successive increments of chopped hay entrained in air to a conveying mechanism;
   conveying the hay to the entrances of a series of adjacent die cells;
   applying force successively to the increments of hay opposite the entrances of the die cells;
   and compacting the hay into and through the die cells thereby forming the hay into compressed laminar wafers.

5. The method of wafering hay which comprises the steps of:
   delivering successive increments of hay to the entrances of a series of adjacent die cells;
   applying force successively to the increments of hay opposite the entrances of the die cells;
   compacting the hay into and through the die cells thereby forming the hay into compressed laminar wafers;
   and maintaining equal pressures on the hay within all of the die cells as unequal quantities of the hay move respectively therethrough so as to form wafers of uniform density.

6. The method of wafering hay which comprises the steps of:
   delivering successive increments of hay entrained in air to a conveying mechanism;
   conveying the hay to the entrances of a series of adjacent die cells;
   applying force successively to the increments of hay opposite the entrances of the die cells;
   compacting the hay into and through the die cells thereby forming the hay into compressed laminar wafers.
   and breaking the compacted hay extruded from the die cells into wafers of substantially uniform length.

7. The method of wafering hay which comprises the steps of:
   delivering successive increments of hay to the entrances of a series of adjacent die cells;
   applying force successively to the increments of hay opposite the entrances of the die cells;
   compacting the hay into and through the die cells thereby forming the hay into compressed laminar wafers;
   and changing the size of the exits of the die cells as the quantity of hay moving therethrough varies to maintain a uniform density of successive wafers.

8. The method of wafering hay which comprises the steps of:
   delivering the hay entrained in air to a conveying mechanism;
   conveying the hay centrifugally to the entrances of an annular series of sharp-edged, closely adjacent die cells;
   applying force successively to the hay opposite the entrances of the die cells to sever the hay between adjacent die cells;

and compacting the hay into and through the die cells thereby forming the hay into compressed laminar wafers.

9. The method of wafering hay which comprises the steps of:

delivering chopped hay in a moving air stream comingling the stem and leaf portions thereof while suspended in air to the entrances of a series of adjacent die cells;

separating the excess air therefrom;

applying force successively to the hay opposite the entrances of the die cells;

compacting the hay into and through the die cells thereby forming the hay into compressed laminar wafers;

and re-circulating excess air containing loose hay particles to co-mingle the same with subsequently chopped hay for subsequent delivery therewith to said die cells.

10. The method of wafering hay defined in claim 1 which comprises the additional steps of:

adding sufficient heat to the hay to agglutinize the natural juices thereof but without exceeding a temperature of 220° F.

11. The method of wafering hay as defined in claim 1 which comprises the additional steps of:

conveying away the wafers;

collecting fines from the wafers;

and redelivering the fines to the entrances of the die cells for inclusion in subsequent wafers.

12. The method of wafering hay defined in claim 1 wherein the successive increments of hay are delivered to the entrances of a series of sharp-edged, closely adjacent die cells:

the successive increments of hay are pressed by successive applications of force opposite only the major central portions of the cell entrances and the sharp edges between adjacent die cells to sever the hay between adjacent die cells; and the hay is compacted into and through the die cells forming the hay into compressed laminar wafers with the central portion of the hay in each cell leading the edge portions thereof.

References Cited

UNITED STATES PATENTS

| | | | |
|---|---|---|---|
| 2,063,404 | 12/1936 | Selman | 107—14 |
| 2,716,317 | 8/1955 | McClellan | 56—1 |
| 2,732,674 | 1/1956 | Thwaites | 56—364 XR |
| 2,887,718 | 5/1958 | Curran et al. | 56—1 XR |
| 3,009,413 | 11/1961 | Alexander et al. | 56—1 XR |
| 3,023,560 | 3/1962 | Krahn | 56—23 |
| 3,153,889 | 10/1962 | Peterson | 56—1 |
| 3,203,367 | 7/1965 | Lamp | 107—14 |
| 3,230,904 | 1/1966 | Lundell | 107—14 |
| 3,354,844 | 11/1967 | Roll et al. | 107—14 |

ANTONIO F. GUIDA, Primary Examiner

U.S. Cl. X.R.

56—23; 107—14, 54